US009898423B2

(12) United States Patent
Lee et al.

(10) Patent No.: US 9,898,423 B2
(45) Date of Patent: Feb. 20, 2018

(54) MEMORY SWAPPING METHOD, AND HOST DEVICE, STORAGE DEVICE, AND DATA PROCESSING SYSTEM USING THE SAME

(71) Applicants: Jung-Pil Lee, Hwaseong-si (KR); Hwa-Seok Oh, Yongin-si (KR); Kyung-Phil Yoo, Seoul (KR); Myung-Sub Shin, Suwon-si (KR)

(72) Inventors: Jung-Pil Lee, Hwaseong-si (KR); Hwa-Seok Oh, Yongin-si (KR); Kyung-Phil Yoo, Seoul (KR); Myung-Sub Shin, Suwon-si (KR)

(73) Assignee: Samsung Electronics Co., Ltd., Suwon-si, Gyeonggi-do (KR)

(*) Notice: Subject to any disclaimer, the term of this patent is extended or adjusted under 35 U.S.C. 154(b) by 203 days.

(21) Appl. No.: 14/685,619

(22) Filed: Apr. 14, 2015

(65) Prior Publication Data

US 2015/0331628 A1    Nov. 19, 2015

(30) Foreign Application Priority Data

May 19, 2014   (KR) .......................... 10-2014-0059962

(51) Int. Cl.
*G06F 3/06*    (2006.01)
*G06F 12/02*   (2006.01)
(Continued)

(52) U.S. Cl.
CPC ............ *G06F 13/16* (2013.01); *G06F 3/0619* (2013.01); *G06F 3/0655* (2013.01);
(Continued)

(58) Field of Classification Search
CPC ............ G06F 3/06; G06F 12/02; G06F 13/16; G06F 3/0655; G06F 3/0688;
(Continued)

(56) References Cited

U.S. PATENT DOCUMENTS 4,834,541 A    5/1989   Yamaba
4,843,541 A    6/1989   Bean et al.
(Continued)

FOREIGN PATENT DOCUMENTS

EP    2192493 A1    6/2010
EP    2267602 A2   12/2010
EP    1242869 B1   11/2011

OTHER PUBLICATIONS

Stanislav A. Belogolov, Seongsoo Hong, Jiyong Park, Jungkeun Park, "Scheduler-Assisted Prefetching: Efficient Demand Paging for Embedded Systems" 2013 IEEE 19th International Conference on Embedded and Real-Time Computing Systems and Applications (2008).*

(Continued)

*Primary Examiner* — Rocio Del Mar Perez-Velez
(74) *Attorney, Agent, or Firm* — Volentine & Whitt, PLLC

(57) ABSTRACT

A memory swapping method and a data processing system using the same, the memory swapping method including receiving queue information for a memory swapping task from a host device; performing part of the memory swapping task in a storage device based on the queue information; receiving a command corresponding to the queue information from the host device after performing of the part of the memory swapping task is completed; and performing a remaining part of the memory swapping task according to the command by using a result of the part of the memory swapping task that had been previously performed.

15 Claims, 30 Drawing Sheets

(51) Int. Cl.
*G06F 9/30* (2006.01)
*G06F 13/16* (2006.01)
*G06F 12/1009* (2016.01)
*G06F 9/54* (2006.01)

(52) U.S. Cl.
CPC .......... *G06F 3/0659* (2013.01); *G06F 3/0688* (2013.01); *G06F 9/3004* (2013.01); *G06F 9/54* (2013.01); *G06F 12/02* (2013.01); *G06F 12/1009* (2013.01)

(58) Field of Classification Search
CPC ........ G06F 3/0659; G06F 3/0619; G06F 9/54; G06F 9/3004; G06F 12/1009
See application file for complete search history.

(56) References Cited

U.S. PATENT DOCUMENTS

| | | | |
|---|---|---|---|
| 7,356,671 B1 | 4/2008 | Wei | |
| 7,421,572 B1 | 9/2008 | Wolrich et al. | |
| 7,546,444 B1 | 6/2009 | Wolrich et al. | |
| 7,562,180 B2 | 7/2009 | Gyl et al. | |
| 7,681,018 B2 | 3/2010 | Wolrich et al. | |
| 7,698,513 B2 | 4/2010 | Sechrest et al. | |
| 7,716,388 B2 | 5/2010 | Jagathesan et al. | |
| 7,743,235 B2 | 6/2010 | Wolrich et al. | |
| 7,793,059 B2 | 9/2010 | Cornwell et al. | |
| 7,802,064 B2 | 9/2010 | Kim | |
| 7,949,806 B2 | 5/2011 | Jones et al. | |
| 7,991,983 B2 | 8/2011 | Wolrich et al. | |
| 8,214,845 B2 * | 7/2012 | Hoover | G06F 15/7825 711/147 |
| 8,396,994 B1 | 3/2013 | Lee et al. | |
| 8,407,439 B2 | 3/2013 | Okin et al. | |
| 8,788,739 B2 * | 7/2014 | Chang | G06F 9/5016 711/165 |
| 8,914,458 B2 * | 12/2014 | Raindel | G06F 3/061 709/212 |
| 2009/0248959 A1 * | 10/2009 | Tzeng | G06F 12/08 711/103 |
| 2010/0306467 A1 | 12/2010 | Pruthi et al. | |
| 2010/0332741 A1 | 12/2010 | Cornwell et al. | |
| 2012/0096215 A1 | 4/2012 | Zhang et al. | |
| 2012/0102263 A1 | 4/2012 | Aswadhati | |
| 2012/0204005 A1 * | 8/2012 | Dockser | G06F 9/3814 712/205 |
| 2013/0013821 A1 | 1/2013 | Okada | |
| 2013/0054875 A1 | 2/2013 | Ross et al. | |
| 2013/0173847 A1 * | 7/2013 | Sprouse | G11C 7/1012 711/103 |
| 2013/0219399 A1 * | 8/2013 | Wang | G06F 9/30003 718/102 |
| 2015/0074294 A1 * | 3/2015 | Shacham | G06F 13/4243 710/5 |
| 2015/0134857 A1 * | 5/2015 | Hahn | G06F 3/061 710/5 |
| 2015/0212738 A1 * | 7/2015 | D'Eliseo | G06F 3/0659 711/154 |

OTHER PUBLICATIONS

Linux Block IO—Introducing Multi-Queue SSD Access.
Saxena FLASHVM—Virtual Memory Management on Flash (Swap Queue Reorder).

* cited by examiner

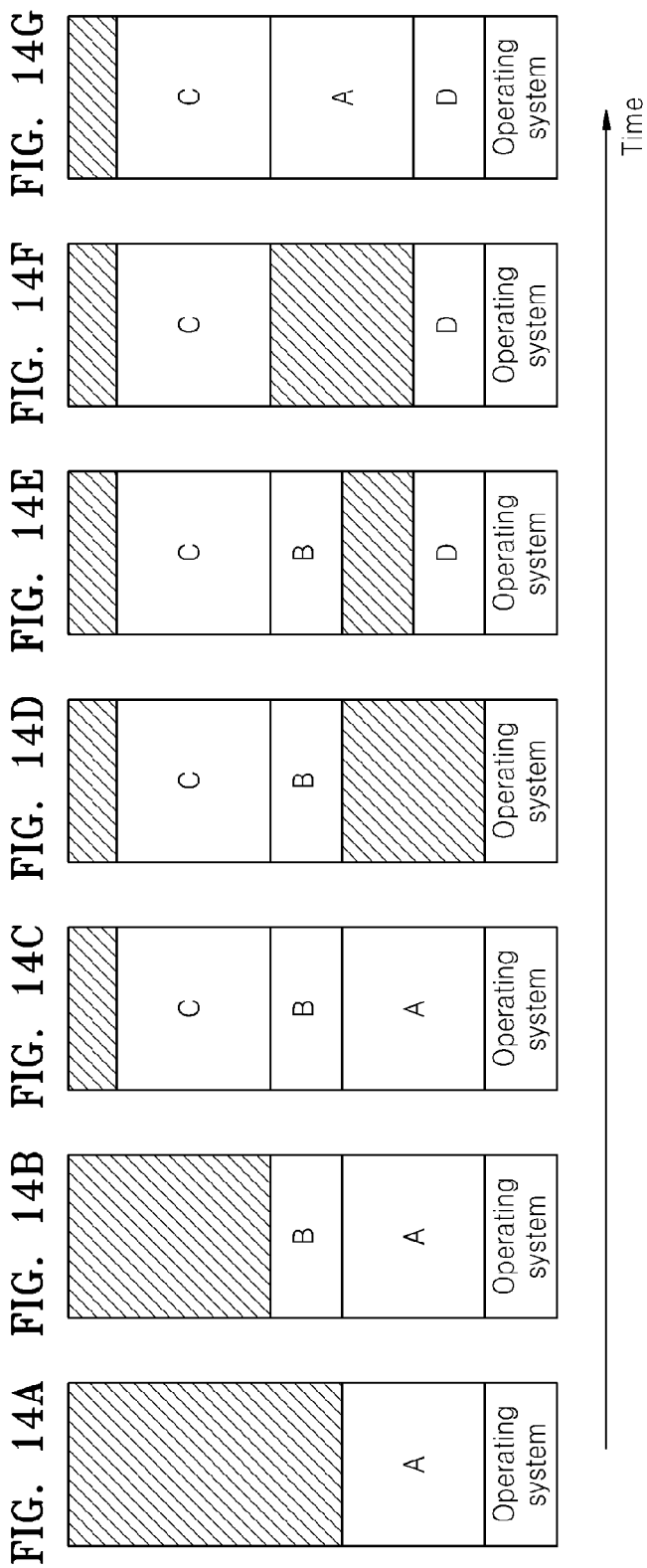

MEMORY SWAPPING METHOD, AND HOST DEVICE, STORAGE DEVICE, AND DATA PROCESSING SYSTEM USING THE SAME

CROSS-REFERENCE TO RELATED APPLICATION

A claim for priority under 35 U.S.C. §119 is made to Korean Patent Application No. 10-2014-0059962, filed on May 19, 2014, in the Korean Intellectual Property Office, the disclosure of which is incorporated herein in its entirety by reference.

BACKGROUND

The inventive concepts described herein relate to a method and apparatus for controlling a memory, and more particularly, to a memory swapping method and a data processing system using the same.

In virtual memory systems, the distribution of storage areas in memory may be changed according to whether processes are necessary. Typically, memory swapping operations in which all or some pages of a process are removed from main memory and loaded back into main memory may be repeatedly performed. The speed at which the memory swapping operations are performed affects the performance of data processing system employing virtual memory systems.

SUMMARY

Embodiments of the inventive concept provide a memory swapping method for increasing a memory swapping speed, a host device for increasing a memory swapping speed, a storage device for increasing a memory swapping speed, and a data processing system for increasing a memory swapping speed.

Embodiments of the inventive concept provide a memory swapping method including receiving queue information for a memory swapping task from a host device, and performing part of the memory swapping task in a storage device based on the queue information. The memory swapping method further includes receiving a command corresponding to the queue information from the host device after the performing of the part of the memory swapping task is completed, and performing a remaining part of the memory swapping task according to the command by using a result of the part of the memory swapping task that has been previously performed.

In some embodiments, the queue information may include information about the memory swapping task and information about an attribute of data that is requested according to the memory swapping task.

In some embodiments, the queue information may further include task priority information.

In some embodiments, the queue information may be transmitted from the host device to the storage device using a preset command.

In some embodiments, when a task for a read command is included in the queue information, the part of the memory swapping task may include an operation of reading data from a nonvolatile memory device of the storage device and storing the read data in a random access memory of the storage device.

In some embodiments, when a task for a write command is included in the queue information, the part of the memory swapping task may include an operation of writing data in the storage device by performing at least one selected from address conversion and memory interleaving scheduling.

In some embodiments, the performing of the part of the memory swapping task may include executing address conversion so that a page-out operation and a page-in operation for the memory swapping task are performed in different memory chips of the storage device based on the queue information, and performing part of at least one selected from a write operation according to the page-out operation and a read operation according to the page-in operation based on a result of the address conversion.

In some embodiments, the page-in operation may be performed wherein a program time of the page-out operation and a read time of the page-in operation partially overlap each other.

In some embodiments, performing of the part of the memory swapping task may include re-establishing a task execution order based on a plurality of pieces of the queue information that are received from the host device, and performing the part of the memory swapping task in the storage device based on the re-established task execution order.

In some embodiments, the re-establishing of the task execution order may be based on priority information that is included in the plurality of pieces of queue information.

In some embodiments, the receiving of the command may include transmitting a signal indicating a queue status of the storage device to the host device, and receiving the command corresponding to the queue information from the host device based on the signal indicating the queue status. The signal indicating the queue status may include information indicating that the performing of the part of the memory swapping task based on the queue information is completed.

Embodiments of the inventive concept provide a host device including a main memory, and a processor configured to perform an application process by using data that is loaded into the main memory. The processor is configured to sequentially transmit queue information for a memory swapping task and a command corresponding to the queue information to a storage device when a page fault occurs.

In some embodiments, the processor may be configured to transmit the queue information to the storage device according to the memory swapping task. The queue information may include information about at least one selected from a page-in operation and a page-out operation.

In some embodiments, the processor may be configured to transmit the queue information to the storage device using a preset command.

In some embodiments, after transmitting the queue information for the memory swapping task to the storage device, the processor may be configured to transmit the command corresponding to the queue information to the storage device based on a queue status of the storage device.

Embodiments of the inventive concept provide a storage device including a memory device to which memory swap space is allocated, and a memory controller configured to control a read operation and a write operation of the memory device. The memory controller is configured to receive queue information for a memory swapping task and a command corresponding to the queue information, control the memory device to perform part of the memory swapping task, based on the received queue information, and then control the memory device such that a remaining part of the memory swapping task is performed according to the command.

In some embodiments, the memory device may include a plurality of flash memory chips, and the memory controller may be configured to execute address conversion to perform a page-out operation and a page-in operation for the memory swapping task in different flash memory chips of the memory device.

In some embodiments, the memory controller may be configured to determine an operation timing so that a program time of the page-out operation and a read time of the page-in operation partially overlap each other.

In some embodiments, the memory controller may be configured to re-establish a task execution order of the memory swapping task based on priority information that is included in the queue information.

In some embodiments, when a task for a page-out operation and a task for a page-in operation for the memory swapping task are included in the queue information, the memory controller may be configured to control a read operation or a write operation of the memory device to firstly perform the page-in operation.

In some embodiments, the memory controller may be configured to generate a signal indicating a queue status of the storage device and transmit the signal to a host device.

Embodiments of the inventive concept provide a data processing system including a host device configured to sequentially transmit queue information for a memory swapping task and a command corresponding to the queue information to a storage device when a page fault occurs. The storage device is configured to receive the queue information and the command, perform part of the memory swapping task based on the queue information received from the host device, and execute a remaining part of the memory swapping task according to the command by using a result of the previously performed part of the memory swapping task.

In some embodiments, when the page fault occurs, after transmitting the queue information for the memory swapping task to the storage device, the host device may be configured to transmit the command corresponding to the queue information to the storage device based on a queue status of the storage device.

In some embodiments, the storage device may be configured to determine an operation timing so that a program time of a page-out operation and a read time of a page-in operation for the memory swapping task partially overlap each other.

In some embodiments, the storage device may include an embedded multimedia card.

BRIEF DESCRIPTION OF THE DRAWINGS

Embodiments of the inventive concept will be more clearly understood from the following detailed description taken in conjunction with the accompanying figures, and wherein like reference numerals refer to like parts throughout the various figures unless otherwise specified.

FIGS. 14A, 14B, 14C, 14D, 14E, 14F and 14G are diagrams illustrating an example where a storage area distribution of a main memory is changed when a new process is invoked in the data processing system, according to an embodiment of the inventive concept.

DETAILED DESCRIPTION OF THE EMBODIMENTS

Figure 1:
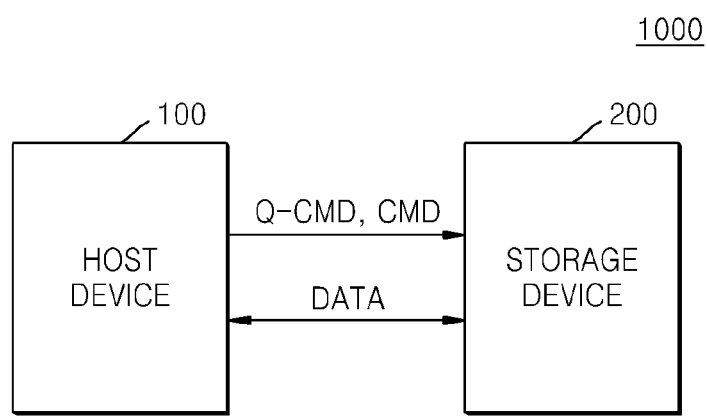
FIG. 1 is a block diagram illustrating a data processing system according to an embodiment of the inventive concept.

As used herein, the term "and/or" includes any and all combinations of one or more of the associated listed items. Expressions such as "at least one of," when preceding a list of elements, modify the entire list of elements and do not modify the individual elements of the list.

The inventive concept will now be described more fully with reference to the accompanying drawings, in which exemplary embodiments of the inventive concept are shown. It should be understood, however, that there is no intent to limit example embodiments of the inventive concept to the particular forms disclosed, but conversely, example embodiments of the inventive concept are to cover all modifications, equivalents, and alternatives falling within the spirit and scope of the inventive concept. Like reference numerals denote like elements in the drawings. In the attached drawings, sizes of structures may be exaggerated for clarity.

The terminology used herein is for the purpose of describing example embodiments only and is not intended to be limiting of example embodiments of the inventive concept. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, parts, or combinations thereof, but do not preclude the presence or addition of one or more other features, integers, steps, operations, elements, parts, or combinations thereof.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram illustrating a data processing system 1000 according to an embodiment of the inventive concept.

As shown in FIG. 1, the data processing system 1000 includes a host device 100 and a storage device 200.

The host device 100 and the storage device 200 are electrically connected to each other. The host device 100 may transmit queue information Q-CMD and a command CMD to the storage device 200. Data may be transmitted/received between the host device 100 and the storage device 200. For example, the storage device 200 may be an embedded multimedia card (eMMC).

When a page fault occurs, the host device 100 sequentially transmits the queue information Q-CMD for a memory swapping task and the command CMD corresponding to the queue information Q-CMD to the storage device 200. The page fault may occur when a page to be read in order for the host device 100 to perform an application process is not stored in the host device 100. For example, the queue information Q-CMD may include queue information about at least one selected from a page-in operation and a page-out operation for a memory swapping operation. The queue information Q-CMD is information indicating a task for a read command or a write command to perform at least one selected from the page-in operation and the page-out operation for the memory swapping operation. The queue information Q-CMD may include information about the memory swapping task and information about an attribute of data requested by the host device 100. The queue information Q-CMD may include task priority information. Also, the queue information Q-CMD may be transmitted to the storage device 200 by using a preset command.

The storage device 200 previously performs part of the memory swapping task based on the queue information Q-CMD that is transmitted from the host device 100. Next, when the command CMD corresponding to the queue information Q-CMD is received, the storage device 200 executes a remaining part of the memory swapping task by using the part of the memory swapping task that has been previously performed. That is, the storage device may perform a part of the memory swapping task based on the queue information Q-CMD, and thereafter based on the command CMD may perform a remaining part of the memory swapping task by using the part of the memory swapping task previously or already performed.

Data DATA according to the page-out operation or the page-in operation for the memory swapping task may be transmitted and received between the host device 100 and the storage device 200 via a data bus.

Figure 2:
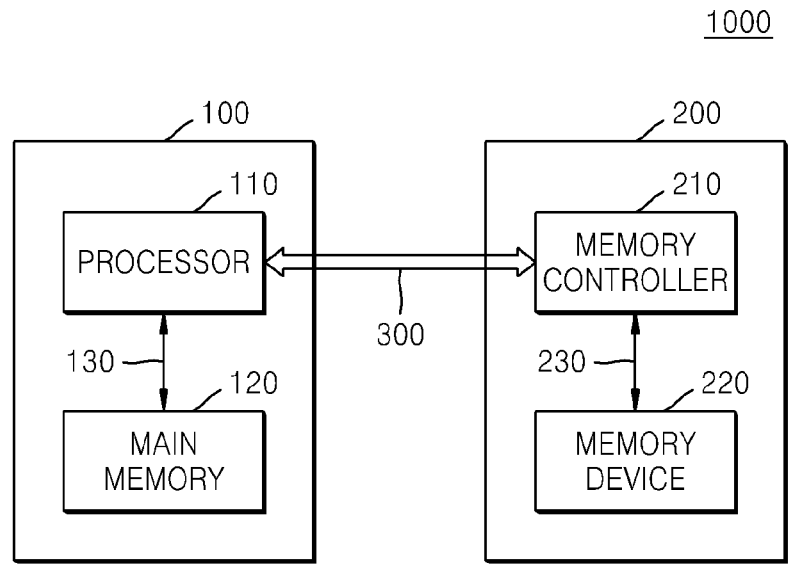
FIG. 2 is a block diagram illustrating elements of the data processing system shown in FIG. 1, according to an embodiment of the inventive concept.

FIG. 2 is a block diagram illustrating elements of the data processing system 1000 shown in FIG. 1, according to an embodiment of the inventive concept.

As shown in FIG. 2, the host device 100 of the data processing system 1000 includes a processor 110 and a main memory 120.

The processor 110 performs applications for performing tasks or specific calculations. For example, the processor 110 may be a microprocessor or a central processing unit (CPU).

The processor 110 is electrically connected to the main memory 120. The processor 110 may be connected to the main memory 120 via a bus 130 that includes an address bus, a control bus, and/or a data bus. The processor 110 may read data that is loaded into the main memory 120 and may perform various processes.

Data necessary to perform a process in the host device 100 is stored in the main memory 120. Here, the term "data" includes a program and stack information.

The main memory 120 may be, for example, a dynamic random-access memory (DRAM) or a static random-access memory (SRAM).

The processor 110 may allocate a virtual memory address, instead of an actual memory address, to each program by using a virtual memory system. This method may be used in a multitasking operating system, and is used as a method for providing a larger memory area than the main memory 120. Since a program in the virtual memory system uses an address space larger than a capacity of the main memory 120, information of all address spaces used in program data may not be loaded into the main memory 120. Accordingly, only a part of program data necessary to execute the program is loaded into the main memory 120, and a remaining part of the program data is stored in a memory device 220 of the storage device 200 that is used as a swap space.

A memory swapping operation is used to execute a program larger than the main memory 120 in the virtual memory system, or the memory swapping operation may be used to handle a data file larger than the main memory 120 in the virtual memory system. For example, during memory swapping, data may be exchanged in units of pages or segments.

When all pages or each page of a process needs to be removed from the main memory 120, the processor 110 stores the data to be removed in the memory device 220 of the storage device 200 by using a memory swapping operation.

When a page fault occurs, the processor 110 sequentially transmits queue information Q-CMD and command CMD for a memory swapping task to the storage device 200 via a wired or wireless interface 300.

When there is a request to perform a new process, the processor 110 determines whether data about the requested process is loaded into the main memory 120. If the data about the requested process is not loaded into the main memory 120, a page fault occurs. Once the page fault occurs, the processor 110 firstly transmits the queue information Q-CMD for the memory swapping task to the storage device 200. Next, the processor 110 transmits the command CMD for the memory swapping task to the storage device 200.

For example, the processor 110 may transmit the queue information Q-CMD to the storage device 200 by using a preset command. For example, the processor 110 may transmit the queue information Q-CMD to the storage device 200 by using a special command indicating parameters of tasks queued in an eMMC protocol.

The storage device 200 of the data processing system 1000 includes a memory controller 210 and the memory device 220.

The memory controller 210 of the storage device 200 may receive information from the processor 110 of the host device 100 or may transmit information to the processor 110 via the wired or wireless interface 300.

The memory controller 210 is electrically connected to the memory device 220. The memory controller 210 may be connected to the memory device 220 via a bus 230 that includes an address bus, a control bus, and/or a data bus.

A memory swap space is allocated to the memory device 220 that is a non-volatile memory device. Accordingly, memory swapping data may be stored in the memory swap space of the memory device 220. Examples of the memory device 220 may include a flash memory, a phase change RAM (PRAM), a ferroelectric RAM (FRAM), and a magnetic RAM (MRAM), and the like. For example, the memory device 220 may include a plurality of flash memory chips.

The memory controller 210 controls an erase operation, a write operation, or a read operation in the memory device 220 in response to the queue information Q-CMD and the command CMD that are received from the host device 100.

The memory controller 210 controls a read operation or a write operation of the memory device 220 to previously perform part of the memory swapping task based on the queue information Q-CMD that is transmitted from the host device 100 and to execute a remaining part of the memory swapping task according to the command CMD by using the part of the memory swapping task that has been previously performed.

For example, the memory controller 210 may execute address conversion in order for a page-out operation and a page-in operation for the memory swapping task to be performed in different flash memory chips of the memory device 220.

For example, the memory controller 210 may determine an operation timing in order for a program time of the page-out operation and a read time of the page-in operation to partially overlap with each other.

For example, when tasks for the page-out operation and the page-in operation for the memory swapping task are included in the queue information Q-CMD, the memory controller 210 may control an order of a read operation or a write operation of the memory device 220 to firstly perform the page-in operation.

For example, the memory controller 210 may re-establish a task execution order based on priority information included in the queue information Q-CMD. That is, the memory controller 210 may control the memory device 220 to re-establish an order of the queue information Q-CMD according to a priority included in the queue information Q-CMD and to previously perform part of the memory swapping task according to the re-established order of the queue information Q-CMD. The memory controller 210 may transmit the re-established order of the queue information to the host device 100.

For example, the memory controller 210 may transmit a signal indicating a queue status of the storage device 200 to the host device 100. That is, the memory controller 210 may transmit a signal to the host device 100 indicating that a queue of the storage device 200 is ready.

Figure 3:
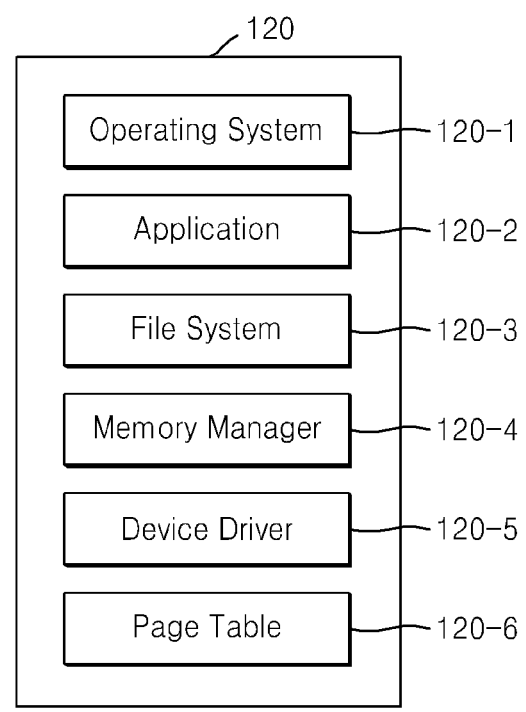
FIG. 3 is a block diagram illustrating programs and pieces of data stored in a main memory shown in FIG. 2, according to an embodiment of the inventive concept.

FIG. 3 is a block diagram illustrating programs or pieces of data stored in the main memory 120 shown in FIG. 2, according to an embodiment of the inventive concept.

Referring to FIG. 3, an operating system 120-1, an application 120-2, a file system 120-3, a memory manager 120-4, a device driver 120-5, and a page table 120-6 may be stored in the main memory 120.

The operating system 120-1 is a program that controls hardware and software resources of the host device 100. The operating system 120-1 functions as an interface between hardware and an application program, and manages resources of the host device 100.

The application 120-2 includes various application programs that are executed in the host device 100. For example, the application 120-2 may include programs that support an operation of processing a file or data.

The file system 120-3 is a program that manages a logical address and a storage location in order to store or search for a file or data in the main memory 120 of the host device 100 or in the storage device 200 connected to the host device 100.

The memory manager 120-4 is a program that controls a memory access operation to the main memory 120 or a memory access operation to the storage device 200 that is connected to the host device 100.

The device driver 120-5 is a program that supports communication with the storage device 200 that is connected to the host device 100.

Page lists of information that are stored in the main memory 120 and in the storage device 200 connected to the host device 100 are stored in the page table 120-6. For example, the page lists may include information about a physical page address corresponding to a logical page address. For example, it may be determined whether information to be accessed is stored in the main memory 120 or stored in the storage device 200 connected to the host device 100 based on the physical address that is stored in the page table 120-6. For example, memory map information may be included in the page table 120-6. Alternatively, the memory map information may be stored separate from the page table 120-6.

Referring to FIGS. 2 and 3, the processor 110 may search the page table 120-6 by using at least one program selected from the operating system 120-1, the file system 120-3, and the memory manager 120-4 that are loaded into the main memory 120 and may determine whether a page fault occurs in a newly generated process. Also, when it is determined that a page fault occurs by using at least one program selected from the operating system 120-1, the file system 120-3, the memory manger 120-4, and the device driver 120-5, the processor 110 may sequentially transmit the queue information Q-CMD and the command CMD for the memory swapping task to the storage device 200.

Figure 4:
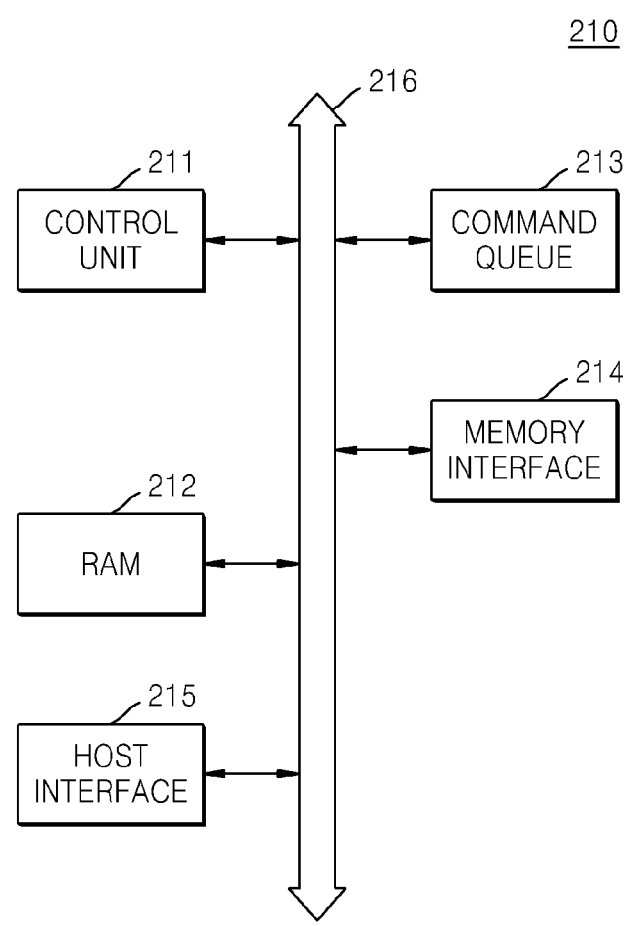
FIG. 4 is a detailed block diagram illustrating a memory controller shown in FIG. 2, according to an embodiment of the inventive concept.

FIG. 4 is a detailed block diagram illustrating the memory controller 210 shown in FIG. 2, according to an embodiment of the inventive concept.

As shown in FIG. 4, the memory controller 210 includes a control unit 211, a RAM 212, a command queue 213, a memory interface 214, a host interface 215, and a bus 216.

The bus 216 refers to a transmission path through which data, an address, and control signals are transmitted between elements of the memory controller 210.

Data that is transmitted from the host device 100 and data that is generated by the control unit 211 are temporarily stored in the RAM 212, or data that is to be transmitted to the host device 100 is temporarily stored in the RAM 212. Also, an area where parameter values used for address conversion and meta data are stored is allocated to the RAM 212. An area where pieces of the queue information Q-CMD transmitted from the host device 100 are stored may also be allocated to the RAM 212. Examples of the RAM 212 may include a DRAM and an SRAM.

Commands that are received from the host device 100 are sequentially stored in the command queue 213.

The control unit 211 controls an overall operation of the storage device 200. In detail, the control unit 211 decodes the queue information Q-CMD and the command CMD that are received from the host device 100, and controls the storage device 200 to perform an operation according to a result of the decoding.

The control unit 211 previously performs part of a memory swapping task based on the queue information Q-CMD that is transmitted from the host device 100. Also, the control unit 211 controls a write operation or a read operation of the memory device 200 to perform a remaining part of the memory swapping task by using the part of the memory swapping task that has been previously performed when the command CMD corresponding to the queue information Q-CMD is received from the host device 100.

Figure 17:
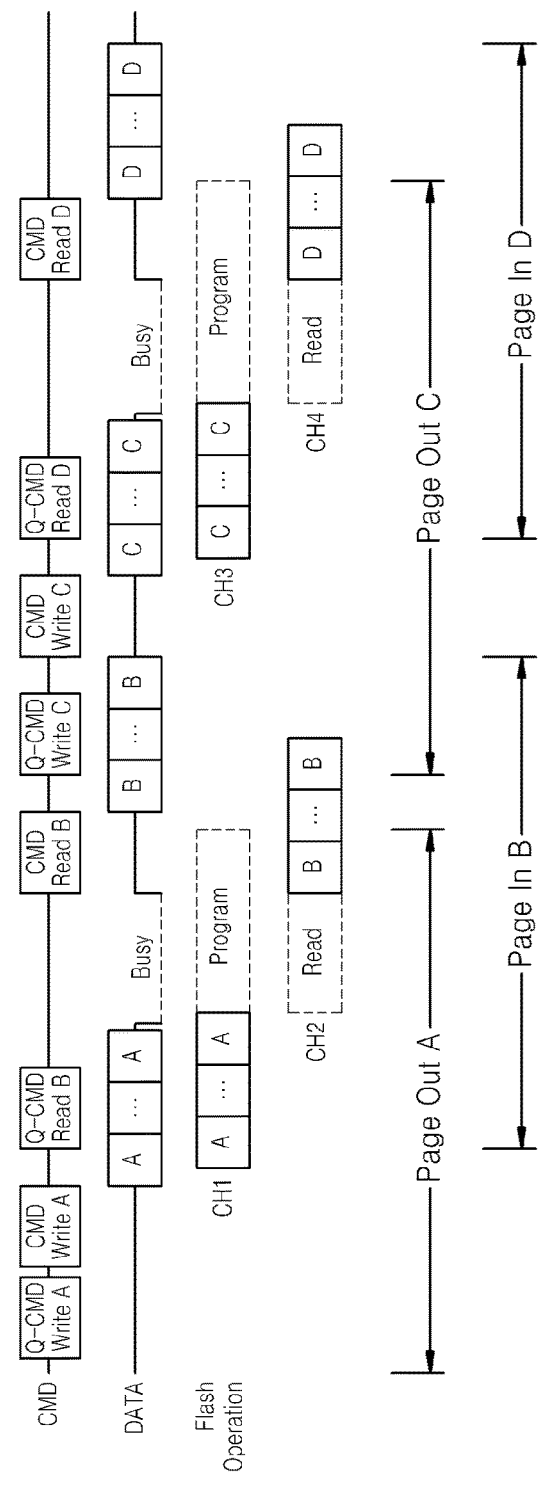
FIG. 17 is a diagram illustrating a memory swapping operation in the data processing system, according to another embodiment of the inventive concept.

For example, the control unit 211 may execute address conversion in order for a page-out operation and a page-in operation for the memory swapping task based on the queue information Q-CMD to be performed in different flash memory chips of the memory device 220. For example, as shown in FIG. 17, the control unit 211 may determine an operation timing in order for a program time of the page-out operation and a read time of the page-in operation to partially overlap with each other.

For example, the control unit 211 may re-establish a task execution order based on priority information included in the queue information Q-CMD. That is, the control unit 211 may re-establish an order of pieces of the queue information Q-CMD according to the priority included in the queue information Q-CMD, and may control the memory device 220 to previously perform part of the memory swapping task according to the re-established order of the pieces of the queue information Q-CMD.

For example, the control unit 211 may transmit a signal indicating a status of the command queue 213 to the host device 100. That is, the control unit 211 may transmit a signal to the host device 100 indicating that the command queue 213 is ready to be performed. For example, the control unit 211 may transmit a signal to the host device 100 indicating that preparation is completed according to the queue information Q-CMD.

The memory interface 214 is electrically connected to the memory device 220. The memory interface 214 exchanges a command, an address, and data with the memory device 220 under the control of the control unit 211. The memory interface 214 may be configured to support a NAND flash memory or a NOR flash memory. The memory interface 214 may be configured to selectively perform software and hardware interleaving operations through a plurality of channels.

The host interface 215 includes a data exchange protocol with the host device 100 and connects the storage device 200 and the host device 100. Examples of the host interface 215 may include an advanced technology attachment (ATA) interface, a serial advanced technology attachment (SATA) interface, a parallel advanced technology attachment (PATA) interface, a universal serial bus (USB) or serial attached small (SAS) computer system interface, a small computer system interface (SCSI), an eMMC interface, and a unix file system (UFS) interface, and so on. However, the example embodiments are not limited to the above noted interfaces. In detail, the host interface 215 exchanges a command, an address, and data with the host device 100 under the control of the control unit 211.

Figure 5:
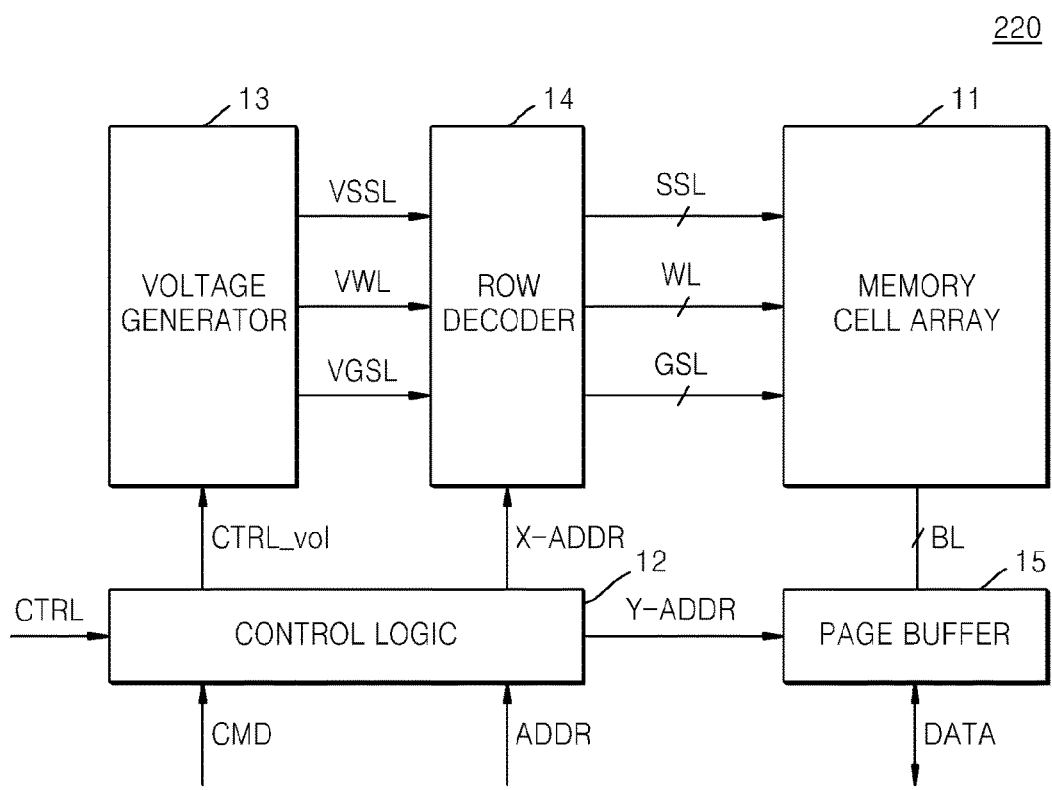
FIG. 5 is a detailed block diagram illustrating a memory device shown in FIG. 2, according to an embodiment of the inventive concept.

FIG. 5 is a detailed block diagram illustrating the memory device 220 shown in FIG. 2, according to an embodiment of the inventive concept.

Referring to FIG. 5, the memory device 220 may include a memory cell array 11, a control logic 12, a voltage generator 13, a row decoder 14, and a page buffer 15. Elements included in the memory device 220 will now be explained in detail.

The memory cell array 11 may be connected to one or more string selection lines SSL, a plurality of word lines WL, and one or more ground selection lines GSL. Also, the memory cell array 11 may be connected to a plurality of bit lines BL. The memory cell array 11 may include a plurality of memory cells MC (see FIGS. 7, 8, and 10) that are disposed at points where the plurality of word lines WL and the plurality of bit lines BL intersect each other.

When an erase voltage is applied to the memory cell array 11, the plurality of memory cells MC change to an erase state, and when a program voltage is applied to the memory cell array 11, the plurality of memory cells MC change to a program state. In this case, each of the memory cells MC may have one state selected from an erase state and first through nth program states P1 through Pn that are defined according to a threshold voltage.

Here, n may be a natural number equal to or greater than 2. For example, when each of the memory cells MC is a 2-bit level cell, n may be 3. Alternatively, when each of the memory cells MC is a 3-bit level cell, n may be 7. Alternatively, when each of the memory cells MC is a 4-bit level cell, n may be 15. As such, the plurality of memory cells MC may include multi-level cells. However, the present embodiment is not limited thereto, and the plurality of memory cells MC may include single-level cells.

The control logic 12 may output various control signals for writing data to the memory cell array 11 or reading data from the memory cell array 11, based on a command CMD, an address ADDR, and a control signal CTRL that are received from the memory controller 210. Accordingly, the control logic 12 may control various operations in the memory device 220.

The various control signals that are output from the control logic 12 may be applied to the voltage generator 13, the row decoder 14, and the page buffer 15. In detail, the control logic 12 may apply a voltage control signal CTRL_vol to the voltage generator 13, a row address X_ADDR to the row decoder 14, and a column address Y_ADDR to the page buffer 15.

The voltage generator 13 may generate various voltages for performing a program operation, a read operation, and an erase operation on the memory cell array 11 based on the voltage control signal CTRL_vol. In detail, the voltage generator 13 may generate a first driving voltage VWL for driving the plurality of word lines WL, a second driving voltage VSSL for driving the plurality of string selection lines SSL, and a third driving voltage VGSL for driving the plurality of ground selection lines GSL.

In this case, the first driving voltage VWL may be a program voltage (or a write voltage), a read voltage, an erase voltage, a pass voltage, or a program verification voltage. Also, the second driving voltage VSSL may be a string selection voltage, that is, an on voltage or an off voltage. Furthermore, the third driving voltage VGSL may be a ground selection voltage, that is, an on voltage or an off voltage.

In FIG. 5, when a program loop starts based on the voltage control signal CTRL_vol, that is, when a number of the program loops is 1, the voltage generator 13 may generate a program start voltage as a program voltage. Also, as the number of the program loops increases, the voltage generator 13 may generate a voltage that gradually increases by as much as a step voltage from the program start voltage as a program voltage.

The row decoder 14 may be connected to the memory cell array 11 through the plurality of word lines WL, and may activate some of the plurality of word lines WL in response to the row address X_ADDR that is received from the control logic 12. In detail, during a read operation, the row decoder 14 may apply a read voltage to selected word lines and a pass voltage to non-selected word lines.

During a program operation, the row decoder 14 may apply a program voltage to selected word lines and a pass voltage to non-selected word lines. In FIG. 5, during at least one of program loops, the row decoder 14 may apply a program voltage to selected word lines and additionally selected word lines.

The page buffer 15 may be connected to the memory cell array 11 through the plurality of bit lines BL. In detail, during a read operation, the page buffer 15 may operate as a sense amplifier and may output data DATA that is stored in the memory cell array 11. During a program operation, the page buffer 15 may operate as a write driver and may input the data DATA that is to be stored in the memory cell array 11.

Figure 6:
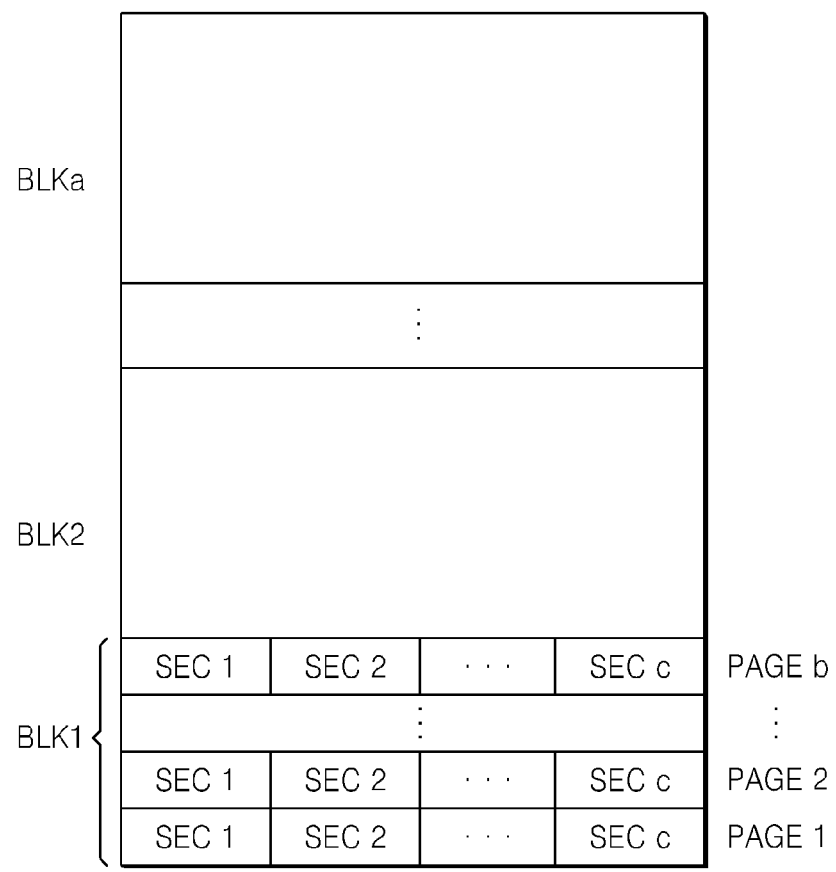
FIG. 6 is a diagram illustrating a memory cell array shown in FIG. 5, according to an embodiment of the inventive concept.

FIG. 6 is a diagram illustrating the memory cell array 11 shown in FIG. 5, according to an embodiment of the inventive concept.

Referring to FIG. 6, the memory cell array 11 may be a flash memory cell array. In this case, the memory cell array 11 may include a (a is an integer equal to or greater than 2) memory blocks BLK1 through BLKa, each of the memory blocks BLK1 through BLKa may include b (b is an integer equal to or greater than 2) pages PAGE1 through PAGEb, and each of the pages PAGE1 through PAGEb may include c (c is an integer equal to or greater than 2) sectors SEC1 through SECc. Although only the pages PAGE0 through PAGEb and the sectors SEC1 through SECc for the memory block BLK1 are illustrated in FIG. 6 for convenience of explanation, the other memory blocks BLK2 through BLKa have the same structure as that of the memory block BLK1.

Figure 7:
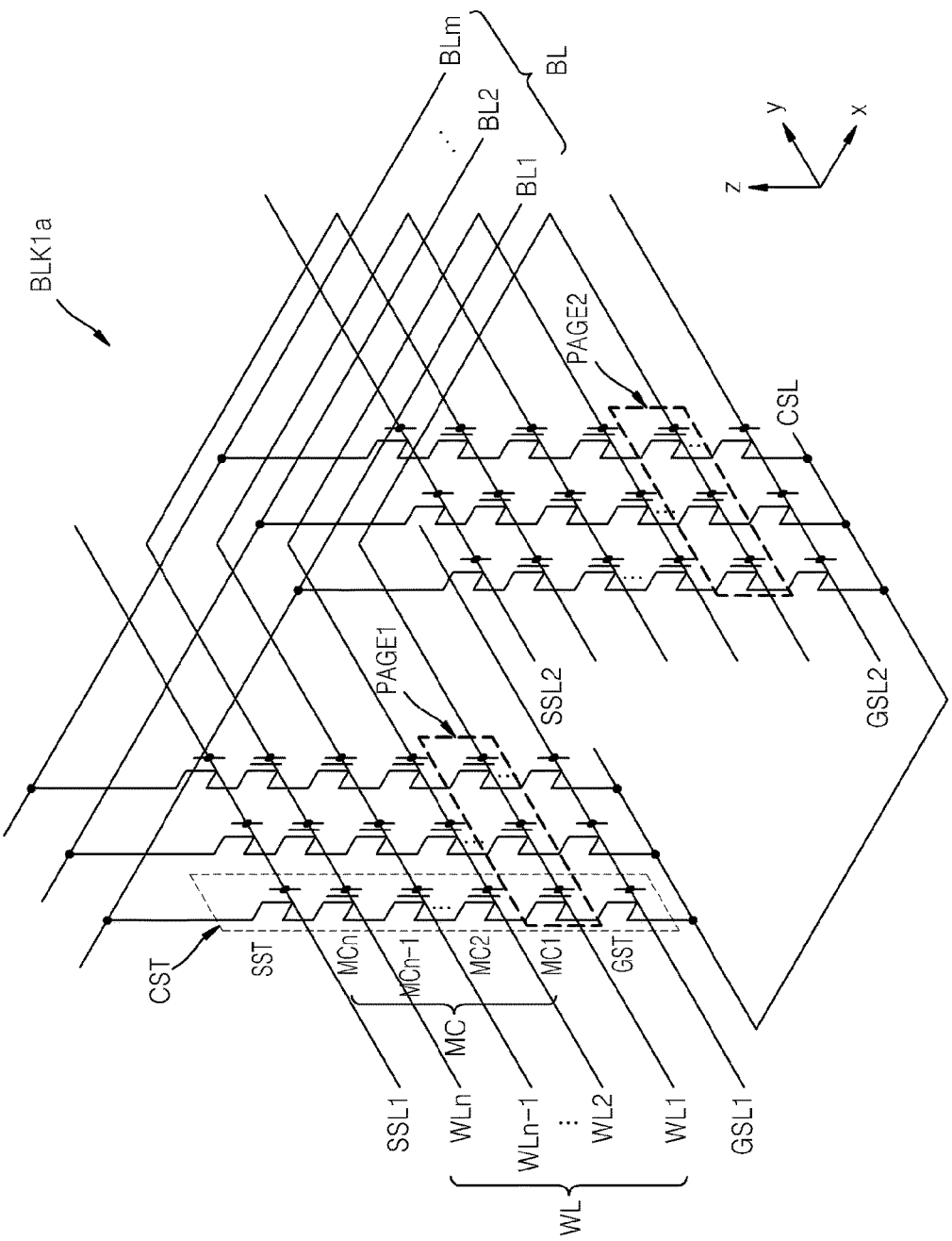
FIG. 7 is a circuit diagram illustrating a first memory block included in the memory cell array shown in FIG. 5, according to an embodiment of the inventive concept.

FIG. 7 is a circuit diagram illustrating the memory block BLK1a (hereinafter, referred to as a first memory block BLK1a) included in the memory cell array 11 shown in FIG. 5, according to an embodiment of the inventive concept.

Referring to FIG. 7, the first memory block BLK1a may be a vertical NAND flash memory. In this case, each of the memory blocks BLK1 through BLKa of FIG. 6 may have such a structure as shown in FIG. 7. In FIG. 7, a first direction is an x direction, a second direction is a y direction, and a third direction is a z direction. However, the present embodiment is not limited thereto, and the first through third directions may be changed.

The first memory block BLK1a may include a plurality of cell strings CST, a plurality of word lines WL, a plurality of bit lines BL, a plurality of ground selection lines GSL, e.g., first and second ground selection lines GSL1 and GSL2, a plurality of string selection lines SSL, e.g., first and second string selection lines SSL1 and SSL2, and a common source line CSL. A number of the cell strings CST, a number of the word lines WL, a number of the bit lines BL, a number of the ground selection lines GSL, and a number of the string selection lines SSL may vary in various ways according to embodiments.

Each of the cell strings CST may include a string selection transistor SST, a plurality of memory cells MC, and a ground selection transistor GST that are serially connected between a corresponding bit line BL and the common source line CSL. However, the present embodiment is not limited thereto, and the cell string CST may further include at least one dummy cell. Alternatively, the cell string CST may include at least two string selection transistors or at least two ground selection transistors.

Also, the cell string CST may extend in the third direction (i.e., the z direction). In detail, the cell string CST may extend in a direction (z direction) perpendicular to a substrate 310 (see FIG. 8). Accordingly, the first memory block BLK1a including the cell string CST may be referred to as a vertical NAND flash memory. As such, since the cell string CST extends in the direction (z direction) perpendicular to the substrate 310, the degree of integration of the memory cell array 11 may be increased.

The plurality of word lines WL may extend in the first direction (i.e., the x direction) and the second direction (i.e., the y direction), and may be respectively connected to the memory cells MC corresponding to the word lines WL. Accordingly, the plurality of memory cells MC that are arranged adjacent to each other in the first direction (i.e., the x direction) and the second direction (i.e., the y direction) on the same layer may be connected to the same word line WL. In detail, each of the word lines WL may be connected to gates of the memory cells MC that are arranged adjacent to each other in the first direction (i.e., the x direction) and the second direction (i.e., the y direction) on the same layer and may control the memory cells MC. In this case, the plurality of memory cells MC may store data, and may perform a program operation, a read operation, or an erase operation under the control of the word line WL connected to the plurality of memory cells MC.

The plurality of bit lines BL may extend in the first direction (i.e., the x direction) and may be connected to the string selection transistors SST. Accordingly, the plurality of string selection transistors SST that are arranged adjacent to each other in the first direction (i.e., the x direction) may be connected to the same bit line BL. In detail, each of the bit lines BLA may be connected to drains of the string selection transistors SST.

The plurality of string selection lines SSL, e.g., the first and second string selection lines SSL1 and SSL2, may extend in the second direction (i.e., the y direction) and may be connected to the string selection transistors SST. Accordingly, the plurality of string selection transistors SST that are arranged adjacent to each other in the second direction (y direction) may be connected to the same string selection line, e.g., the first or second string selection line SSL1 or SSL2. In detail, each of the first and second string selection lines SSL1 and SSL2 may be connected to gates of the string selection transistors SST and may control the string selection transistors SST.

The plurality of ground selection lines GSL, e.g., the first and second ground selection lines GSL1 and GSL2, may extend in the second direction (i.e., the y direction) and may be connected to the ground selection transistors GST. Accordingly, the plurality of ground selection transistors GST that are arranged adjacent to each other in the second direction (i.e., the y direction) may be connected to the same ground selection line, e.g., the first or second ground selection line GSL1 or GSL2. In detail, each of the ground selection line GSL1 and GSL2 may be connected to gates of the ground selection transistors GST and may control the ground selection transistors GST.

Also, the ground selection transistors GST that are included in the cell strings CST may be commonly connected to the common source line CSL. In detail, the common source line CSL may be connected to sources of the ground selection transistors GST.

The plurality of memory cells MC that are commonly connected to the same word line WL and the same string selection line, e.g., the first or second string selection line SSL1 or SSL2 and are arranged adjacent to each other in the second direction (i.e., the y direction) may be referred to as a page PAGE. For example, the plurality of memory cells MC that are commonly connected to the word line WL1 (hereinafter, referred to as a first word line WL1), are commonly connected to the first string selection line SSL1, and are arranged adjacent to each other in the second direction (i.e., the y direction) may be referred to as a first page PAGE1. Also, the plurality of memory cells MC that are commonly connected to the first word line WL1, are commonly connected to the second string selection line SSL2, and are arranged adjacent to each other in the second direction (i.e., the y direction) may be referred to as a second page PAGE2.

In order to perform a program operation on the memory cells MC, a voltage of 0V may be applied to the bit lines BL, an ON voltage may be applied to the string selection lines SSL, and an OFF voltage may be applied to the ground selection lines GSL. The ON voltage may be equal to or greater than a threshold voltage in order to turn on the string selection transistors SST, and the OFF voltage may be less than the threshold voltage in order to turn off the ground selection transistors GST. Also, a program voltage may be applied to selected memory cells from among the memory cells MC, and a pass voltage may be applied to remaining memory cells. Once the program voltage is applied, charges may be injected into the memory cells MC due to F-N tunneling. The pass voltage may be greater than the threshold voltage of the memory cells MC.

In order to perform an erase operation on the memory cells MC, an erase voltage may be applied to a body of the memory cells MC, and a voltage of 0V may be applied to the word lines WL. Accordingly, data of the memory cells MC may be erased at one time.

Figure 8:
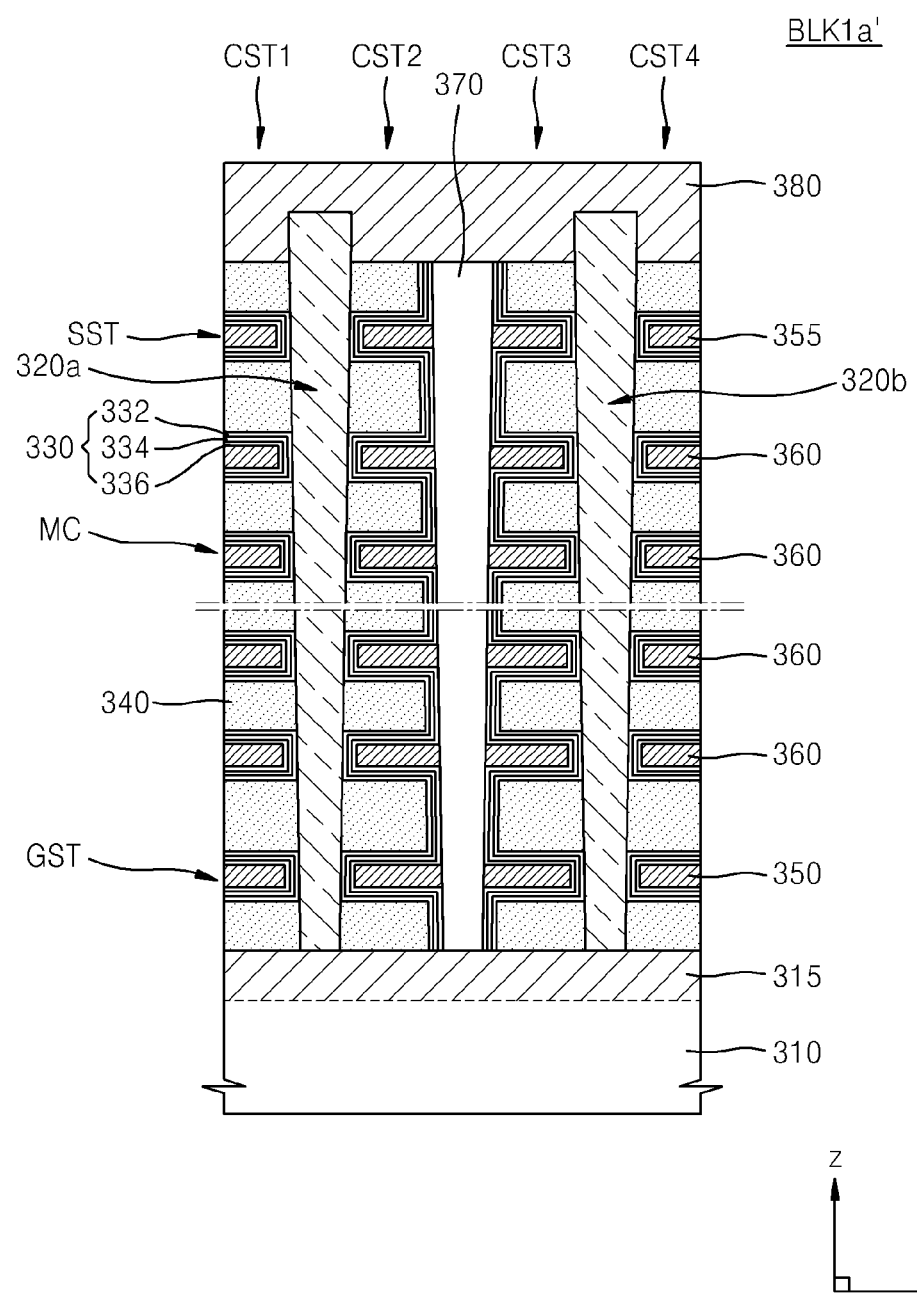
FIG. 8 is a cross-sectional view illustrating a first memory block that is a modification of the first memory block shown in FIG. 7 in a bit line direction, according to an embodiment of the inventive concept.
Figure 9:
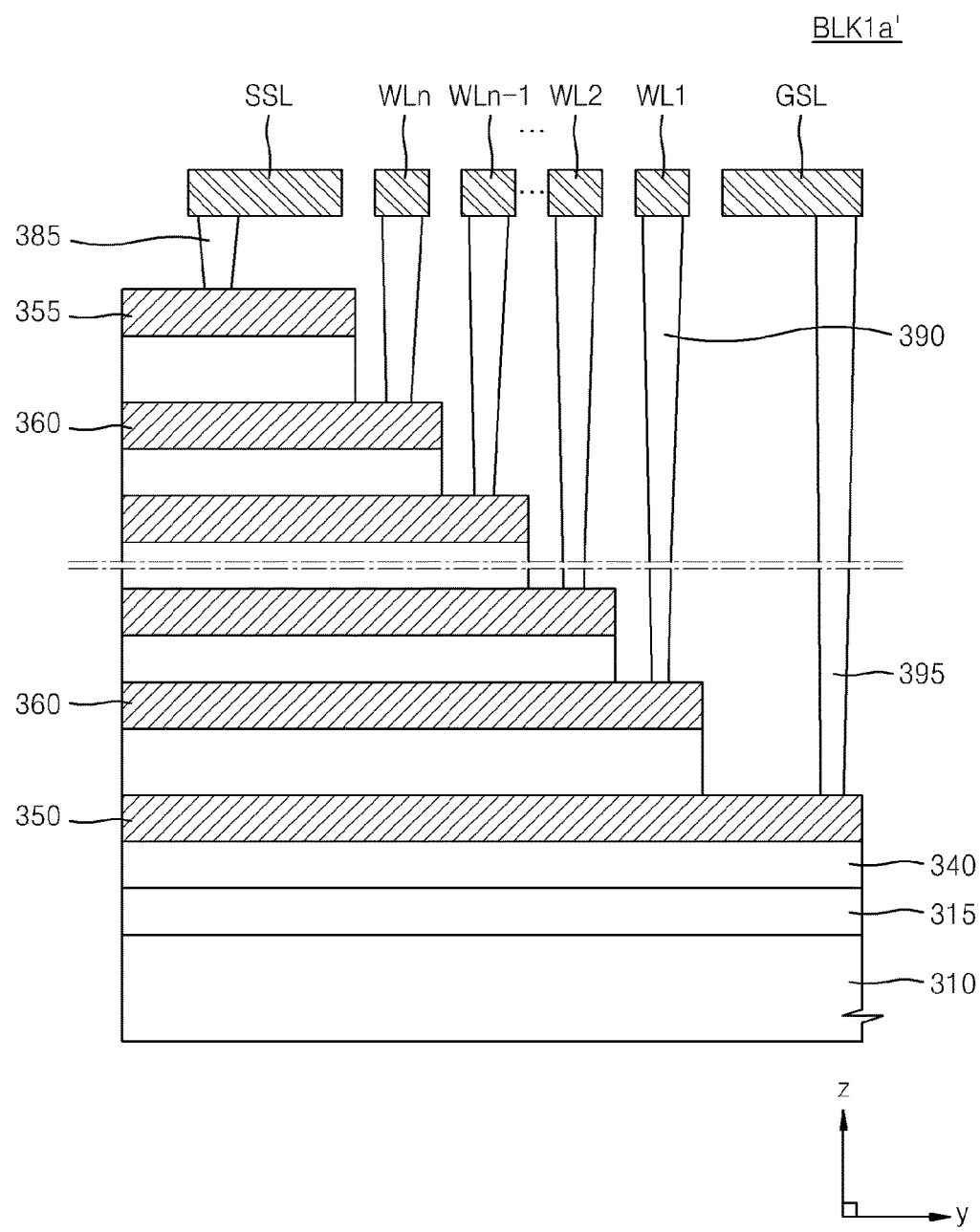
FIG. 9 is a cross-sectional view illustrating the first memory block in a word line direction, according to an embodiment of the inventive concept.

FIG. 8 is a cross-sectional view illustrating a first memory block BLK1a' that is a modification of the first memory block BLK1a shown in FIG. 7 in a bit line direction, according to an embodiment of the inventive concept. FIG. 9 is a cross-sectional view illustrating the first memory block BLK1a' in a word line direction, according to an embodiment of the inventive concept.

Referring to FIGS. 8 and 9, the first memory block BLK1a' may include the substrate 310 having a main surface that extends in the first direction (i.e., the x direction). The substrate 310 may include a semiconductor material, for example, a group IV semiconductor, a group III-V compound semiconductor, or a group II-VI oxide semiconductor. Examples of the group IV semiconductor may include silicon, germanium, and silicon-germanium. In this case, the substrate 310 may be provided as a bulk wafer or an epitaxial layer.

Semiconductor pillars 320a and 320b may be disposed on the substrate 310 to vertically extend from the substrate 310. Each of the semiconductor pillars 320a and 320b may include a semiconductor material such as polycrystalline silicon or monocrystalline silicon, and the semiconductor material may not be doped or may include p-type or n-type impurities.

The substrate 310 may include an impurity region 315 that is formed under the semiconductor pillars 320a and 320b. The impurity region 315 may be a source region, and may form PN junction with another region of the substrate 310. The common source line CSL of FIG. 7 may be connected to the impurity region 315. Alternatively, the impurity region 315 may be defined to only lower ends of the semiconductor pillars 320a and 320b.

Each of the memory cells MC may include a storage medium 330 that is formed on a side wall of each of the semiconductor pillars 320a and 320b and a control gate electrode 360 that is formed on the storage medium 330. Each storage medium 330 may include a tunneling insulating layer 332 that is formed on a side wall of each of the semiconductor pillars 320a and 320b, a charge storage layer 334 that is formed on the tunneling insulating layer 332, and a blocking insulating layer 336 that is formed on the charge storage layer 334.

The charge storage layer 334 may store electric charges. For example, the charge storage layer 334 may be a charge trapping layer, and may include, for example, a silicon nitride layer, quantum dots, or nanocrystals. The quantum dots or the nanocrystals may include a conductor such as metal or semiconductor particles. Each of the tunneling insulating layer 332 and the blocking insulating layer 336 may include an oxide film, a nitride film, or a high-k film. The high-k film may be a dielectric film having a dielectric constant higher than that of the oxide film and the nitride film.

The string selection transistor SST may include a string selection gate electrode 355 that is formed on a side wall of each of the semiconductor pillars 320a and 320b. The string selection transistor SST may be connected to a bit line 380. The bit line 380 may have a linear pattern that extends in the first direction (i.e., the x direction). The ground selection transistor GST may include a ground selection gate electrode 350 that is formed on a side wall of each of the semiconductor pillars 320a and 320b.

The storage media 330 between the string selection transistor SST and each of the semiconductor pillars 320a and 320b and between the ground selection transistor GST and each of the semiconductor pillars 320a and 320b may function as a gate insulating layer, and may be replaced with one insulating layer. Interlayer insulating layers 340 may be disposed between the ground selection gate electrode 350, the control gate electrodes 360, and the string selection gate electrodes 355. The storage media 330 may extend along surfaces of the interlayer insulating layers 340.

First and second cell strings CST1 and CST2 may be disposed adjacent to each other with the semiconductor pillar 320a therebetween, and third and fourth cell strings CST3 and CST4 may be disposed adjacent to each other with the semiconductor pillar 320b therebetween. An insulating layer 370 may be disposed between the second cell string CST2 and the third cell string CST3.

The string selection gate electrode 355 may be connected to the string selection line SSL through a contact plug 385. The control gate electrodes 360 may be connected to corresponding word lines WL1 through WLn that respectively correspond to the control gate electrodes 360 through contact plugs 390. The ground selection gate electrode 350 may be connected to the ground selection line GSL through contact plugs 395.

Figure 10:
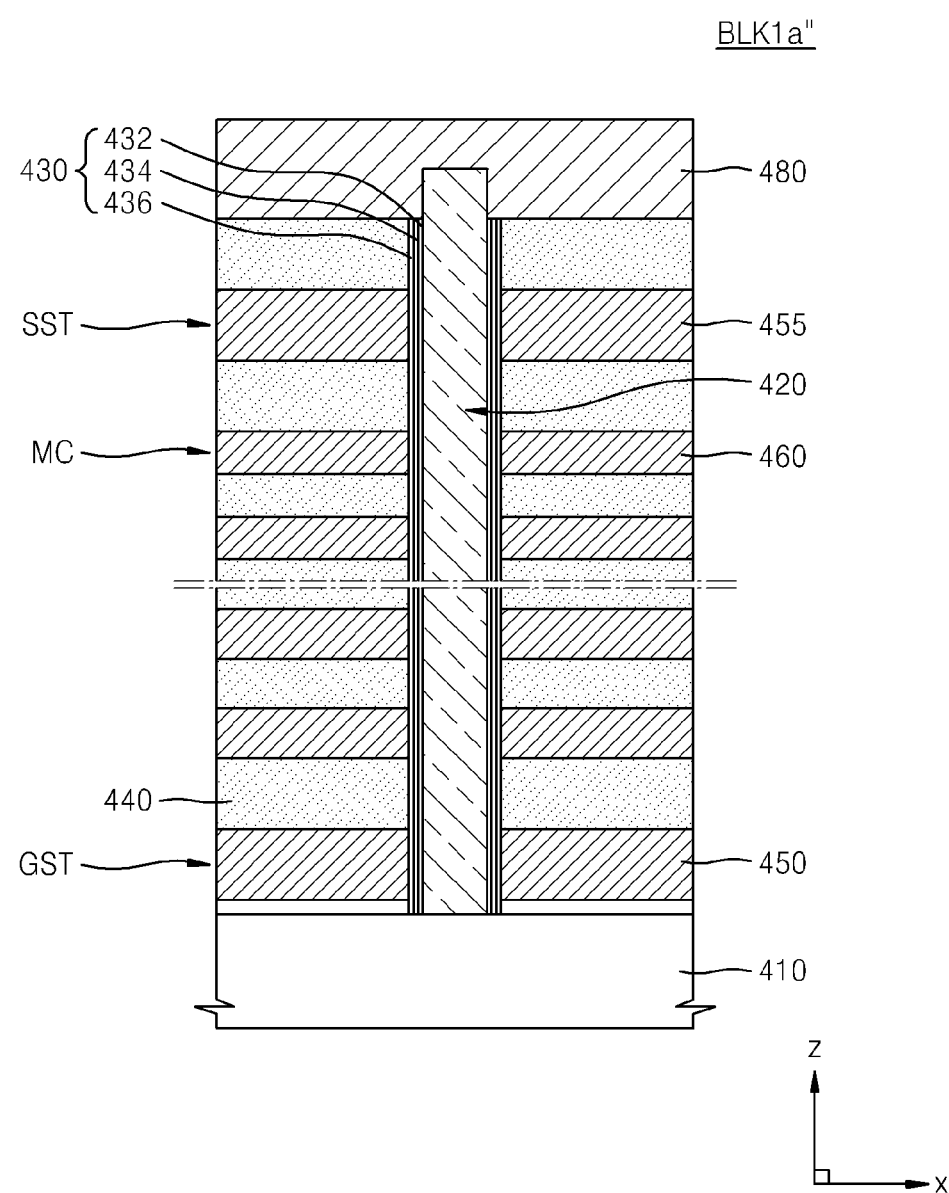
FIG. 10 is a cross-sectional view illustrating a first memory block that is a modification of the first memory block shown in FIG. 7 in the bit line direction, according to another embodiment of the inventive concept.

FIG. 10 is a cross-sectional view illustrating a first memory block BLK1a'' that is a modification of the first memory block BLK1a shown in FIG. 7 in the bit line direction, according to another embodiment of the inventive concept.

Referring to FIG. 10, the first memory block BLK1a'' may include a substrate 410 having a main surface that extends in the first direction (i.e., the x direction). The substrate 410 may include a semiconductor material, for example, a group IV semiconductor, a group III-V compound semiconductor, or a II-VI oxide semiconductor. Examples of the group IV semiconductor may include silicon, germanium, and silicon-germanium. In this case, the substrate 410 may be provided as a bulk wafer or an epitaxial layer.

A semiconductor pillar 420 may be disposed on the substrate 410 to vertically extend from the substrate 410. The semiconductor pillar 420 may include a semiconductor material such as polycrystalline silicon or monocrystalline silicon, and the semiconductor material may not be doped or may include p-type or n-type impurities.

A storage medium 430 may be formed to extend in a longitudinal direction of the semiconductor pillar 420. The storage medium 430 may include a tunneling insulating layer 432 that is formed on a side wall of the semiconductor pillar 420, a charge storage layer 434 that is formed on the tunneling insulating layer 432, and a blocking insulating layer 436 that is formed on the charge storage layer 434.

The string selection transistor SST may include a string selection gate electrode 455 that is formed on a side wall of the semiconductor pillar 420. The string selection transistor SST may be connected to a bit line 480. The bit line 480 may have a linear pattern that extends in the first direction (i.e., the x direction). Each ground selection transistor GST may include a ground selection gate electrode 450 that is formed on a side wall of the semiconductor pillar 420.

The storage media 430 that are formed between the string selection transistor SST and the semiconductor pillar 420 and between the ground selection transistor GST and the semiconductor pillar 420 may function as a gate insulating layer, and may be replaced with one insulating layer. Interlayer insulating layers 440 may be disposed between the ground selection gate electrode 450, control gate electrodes 460, and the string selection gate electrodes 455.

Figure 11:
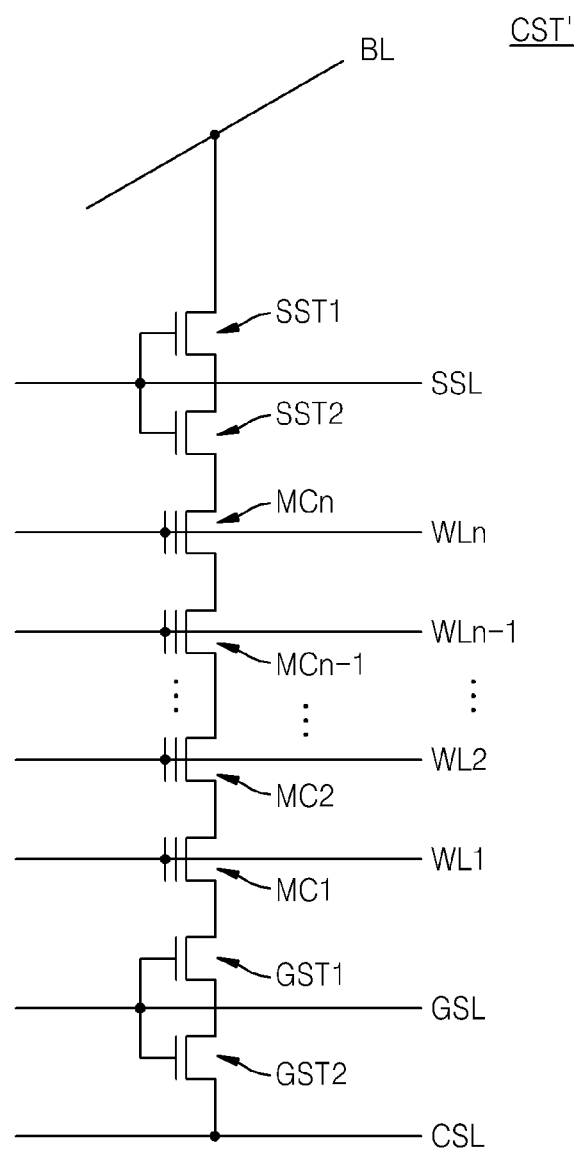
FIG. 11 is a circuit diagram illustrating a cell string that is a modification of a cell string included the first memory block shown in FIG. 7, according to an embodiment of the inventive concept.

FIG. 11 is a circuit diagram illustrating a cell string CST' that is a modification of the cell string CST included in the first memory block BLK1a shown in FIG. 7, according to an embodiment of the inventive concept.

Referring to FIG. 11, the cell string CST may include at least one pair of string selection transistors SST1 and SST2, the plurality of memory cells MC, and at least one pair of ground selection transistors GST1 and GST2. The bit line BL may be connected to one end of the cell string CST' and the common source line CSL may be connected to the other end of the cell string CST'.

Some of the elements included in the cell string CST of FIG. 11 are substantially the same as those included in the cell string CST of FIG. 7. The same elements are denoted by the same reference numerals, and a repeated explanation thereof will not be given. The following will focus on a difference between the cell string CST of FIG. 7 and the cell string CST' of FIG. 11.

The plurality of memory cells MC may be vertically and serially arranged. The memory cells MC may store data. The plurality of word lines WL may be connected to the memory cells MC and may control the memory cells MC. A number of the memory cells MC may be appropriately determined according to a capacity of a nonvolatile memory device.

The at least one pair of string selection transistors SST1 and SST2 may be arranged adjacent to each other at one side of the memory cells MC. For example, the string selection transistors SST1 and SST2 may be disposed between the bit line BL and the nth memory cell MCn and may be serially connected to the nth memory cell MCn. The string selection transistors SST1 and SST2 may control signal transmission between the bit line BL and the memory cells Mc. The string selection line SSL may be commonly connected to the string selection transistors SST1 and SST2. Accordingly, the string selection transistors SST1 and SST2 may interoperate like one transistor.

The at least one pair of ground selection transistors GST1 and GST2 may be arranged adjacent to each other at the other side of the memory cells MC to be opposite to the string selection transistors SST1 and SST2. For example, the ground selection transistors GST1 and GST2 may be disposed between the common source line CSL and the first memory cell MC1 and may be serially connected to the first memory cell MC1. The ground selection transistors GST1 and GST2 may control signal transmission between the common source line CSL and the memory cells MC. The ground selection line GSL may be commonly connected to the ground selection transistors GST1 and GST2. Accordingly, the ground selection transistors GST1 and GST2 may interoperate like one transistor.

In FIG. 11, since a number of the string selection transistors SST1 and SST2 is at least 2, a length of each of the string selection gate electrodes 355 (see FIG. 8) may be greatly reduced than when a number of the string selection transistors is 1, thereby filling a space between the interlayer insulating layers 340 (see FIG. 8) without a void. Moreover, since a number of the ground selection transistors GST1 and GST2 is at least 2, a length of the ground selection gate electrodes 350 (see FIG. 8) may be greatly reduced than when a number of the ground selection transistors is 1, thereby filling a space between the interlayer insulating layers 340 (see FIG. 8) without a void.

Figure 12:
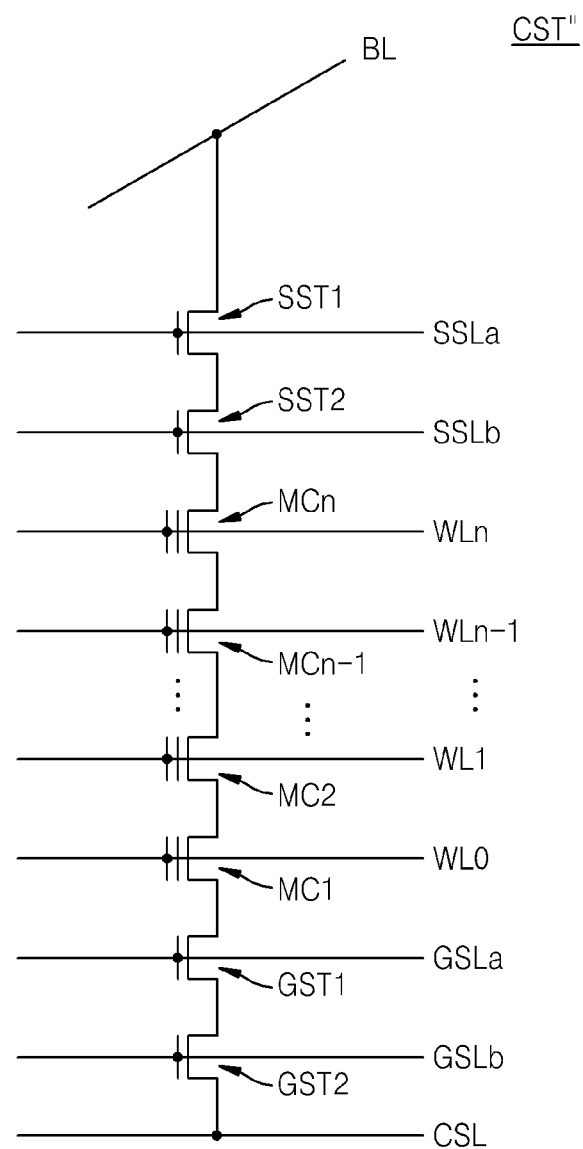
FIG. 12 is a circuit diagram illustrating a cell string that is a modification of the cell string included in the first memory block shown in FIG. 7, according to another embodiment of the inventive concept.

FIG. 12 is a circuit diagram illustrating a cell string CST" that is a modification of the cell string CST included in the first memory block BLK1a shown in FIG. 7, according to another embodiment of the inventive concept.

Referring to FIG. 12, the cell string CST" may include at least one pair of string selection transistors SST1 and SST2, the plurality of memory cells MC, and at least one pair of ground selection transistors GST1 and GST2. The bit line BL may be connected to one end of the cell string CST" and the common source line CSL may be connected to the other end of the cell string CST".

Some of the elements included in the cell string CST" of FIG. 12 are substantially the same as those included in the cell string CST' of FIG. 11. The same elements are denoted by the same reference numerals, and a repeated explanation thereof will not be given. The following will focus on a difference between the cell string CST' of FIG. 11 and the cell string CST" of FIG. 12.

The at least one pair of string selection transistors SST1 and SST2 may be arranged adjacent to each other at one side of the memory cells MC. For example, the string selection transistors SST1 and SST2 may be disposed between the bit line BL and the nth memory cell MCn and may be serially connected to the nth memory cell MCn. The string selection transistors SST1 and SST2 may control signal transmission between the bit line BL and the memory cells MC. In this case, a first string selection line SSLa may be connected to the string selection transistor SST1 and a second string selection line SSLb may be connected to the string selection transistor SST2.

The at least one pair of ground selection transistors GST1 and GST2 may be arranged adjacent to each other at the other side of the memory cells MC to be opposite to the string selection transistors SST1 and SST2. For example, the ground selection transistors GST1 and GST2 may be disposed between the common source line CSL and the first memory cell MC1 and may be serially connected to the first memory cell MC1. The ground selection transistors GST1 and GST2 may control signal transmission between the common source line CSL and the memory cells MC. In this case, a first ground selection line GSLa may be connected to the ground selection transistors GST1 and a second ground selection line GSLb may be connected to the ground selection transistor GST2.

Figure 13:
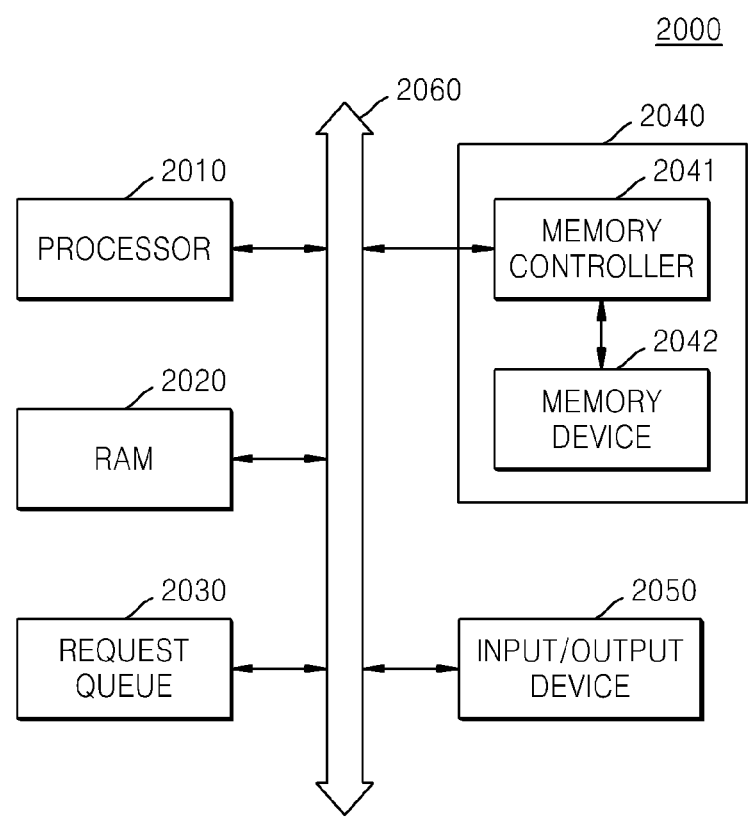
FIG. 13 is a block diagram illustrating a data processing system according to another embodiment of the inventive concept.

FIG. 13 is a block diagram illustrating a data processing system 2000 according to another embodiment of the inventive concept.

As shown in FIG. 13, the data processing system 2000 includes a processor 2010, a RAM 2020, a request queue 2030, a storage device 2040, an input/output device 2050, and a bus 2060.

Although not shown in FIG. 13, the data processing system 2000 may further include ports that may communicate with a video card, a sound card, a memory card, a USB device, and/or other electronic devices. The data processing system 2000 may be an electronic device such as a personal computer, a notebook computer, a cell phone, a personal digital assistant (PDA), or a camera.

The bus 2060 is a transmission path through which data, an address, and control signals are transmitted between elements of the data processing system 2000.

The processor 2010 may perform specific calculations or tasks. For example, the processor 2010 may be a microprocessor or a CPU. The processor 2010 may communicate with the RAM 2020, the request queue 2030, the storage device 2040, and the input/output device 2050 via the bus 2060 such as an address bus, a control bus, or a data bus. According to an embodiment, the processor 2010 may be connected to an expansion bus such as a peripheral component interconnect (PCI) bus.

Data that is necessary to perform a process generated in the processor 2010 is loaded into the RAM 2020. The RAM 2020 may operate as a main memory, and examples of the RAM 2020 may include a DRAM and an SRAM.

Requests that are issued by the processor 2010 are sequentially stored in the request queue 2030. The requests may include a write request, an erase request, or a read request. For example, each of the requests may be defined as a command code. Accordingly, a write command code, an erase command code, or a read command code may be stored in the request queue 2030.

The storage device 2040 includes a memory controller 2041 and a memory device 2042. For example, the storage device 2040 may be an eMMC.

The memory controller 2041 and the memory device 2042 may have the same circuit structure and may perform the same operations as the memory controller 210 and the memory device 220 shown in FIG. 2. Accordingly, the memory controller 2041 may control a write operation or a read operation of the memory device 2042 to previously perform part of a memory swapping task based on queue information Q-CMD that is transmitted from the processor 2010 and to perform a remaining part of the memory swapping task according to a command CMD by using the part of the memory swapping task that has been previously performed. For example, the memory controller 2041 may previously perform part of the memory swapping task based on the queue information Q-CMD and may transmit a signal to the processor 2010 indicating that a command queue for executing the command CMD corresponding to the queue information Q-CMD is ready.

The input/output device 2050 may include an input unit such as a keyboard, a keypad, or a mouse, and an output unit such as a printer or a display unit.

When a new process is requested through the input/output device 2050, the processor 2010 determines whether data that is necessary to perform the requested new process is loaded into the RAM 2020. When the data that is necessary to perform the requested new process is loaded into the RAM 2020, the processor 2010 performs an operation for the requested new process by using the data that is loaded into the RAM 2020.

If the data that is necessary to perform the requested new process is not loaded into the RAM 2020, the processor 2010 issues a request for performing a memory swapping operation and stores the request in the request queue 2030.

Next, the processor 2010 sequentially transmits to the storage device 2040 the queue information Q-CMD for the memory swapping task that is stored in the request queue 2030 and the command CMD corresponding to the queue information Q-CMD. For example, the processor 2010 may transmit the queue information Q-CMD for the memory swapping task that is stored in the request queue 2030 to the storage device 2040 by using a preset command. For example, the processor 2010 may transmit the queue information Q-CMD to the storage device 2040 by using a specific command that indicates parameters of queued tasks.

For example, pieces of information about a block count, a data direction DD, a queue priority, a context-ID, a task ID, and a tag request may be included in the queue information Q-CMD. The data direction DD indicates whether content of a queue is about a read operation or a write operation. The tag request indicates that a request is tagged data. For example, an attribute of data may be indicated by using the context-ID, the task ID, and the tag request.

The processor 2010 transmits the queue information Q-CMD to the memory controller 2041. Next, when the processor 2010 receives a signal indicating that a command queue is ready from the memory controller 2041, the processor 2010 transmits the command CMD corresponding to the queue information Q-CMD to the memory controller 2041.

FIGS. 14A, 14B, 14C, 14D, 14E, 14F and 14G are diagrams illustrating an example where a storage area distribution of a main memory is changed when a new process is invoked in the data processing system 1000, according to an embodiment of the inventive concept.

An example where a storage area distribution of a main memory is changed when a new process is invoked in 14A, 14B, 14C, 14D, 14E, 14F and 14G will now be explained with reference to the data processing system 1000 of FIG. 2.

Referring to FIGS. 14A, 14B, 14C, 14D, 14E, 14F and 14G, when processes are invoked in an order of A->B->C->D->A and are performed in the host device 100, a storage area distribution of the main memory 120 is changed.

First, FIG. 14A illustrates a state where data that is necessary to perform the process A according to an invocation of the process A is stored in the main memory 120. FIG. 14B illustrates a state where data that is necessary to perform the process B according to an invocation of the process B after the process A is performed is stored in the main memory 120. FIG. 14C illustrates a state where data that is necessary to perform the process C according to an invocation of the process C after the process B is performed is stored in the main memory 120.

Referring to FIGS. 14A through 14C, there is a free storage space in the main memory 120 when the data for the processes A->B->C is loaded into the main memory 120.

In FIG. 14D, there is an insufficient storage space in the main memory 120 for data that is necessary to perform the process D according to an invocation of the process D after the process C is performed. Accordingly, FIG. 14D illustrates a state where the data for the process A is removed from the main memory 120 by being moved to the storage device 200. For example, oldest data may be determined to be first removed from the main memory 120.

FIG. 14E illustrates a state where after the data for the process A is removed from the main memory 120, the data that is necessary to perform the invoked process D is stored in the main memory 120.

In FIG. 14F, there is an insufficient storage space in the main memory 120 for the data that is necessary to perform the process A when the process A is re-invoked after the process D is performed. Accordingly, FIG. 14F illustrates a state where the data for the process B that has been stored in the storage device 200 is removed from the main memory 120.

FIG. 14G illustrates a state where after the data for the process B is removed from the main memory 120, the data that is necessary to perform the re-invoked process A is stored in the main memory 120.

Referring to FIGS. 14A through 14G, processes of removing and re-invoking all pages or each page of a process from the main memory 120 are repeatedly performed, which accompany memory swapping operations.

As such, a storage area of the storage device 200 that is used as an actual expansion space in an operating system that supports a virtual memory system is referred to as a swap space. For example, in order to form a space in the main memory 120 into which a new program is to be loaded, at least one of programs that are loaded in the main memory 120 may be selected and may be moved to the swap space of the storage device 200 during a memory swapping task.

Various embodiments of a memory swapping method that is performed in the data processing system 1000 shown in FIGS. 1 and 2 or the data processing system 2000 shown FIG. 13 will be explained.

For convenience of explanation, embodiments of a memory swapping method that is performed in the data processing system 2000 shown in FIG. 13 will be explained with reference to FIGS. 15A through 22.

For example, FIGS. 15A through 22 illustrate a memory swapping operation when the memory device 2042 of the storage device 2040 includes a plurality of flash memory chips.

Figure 15C:
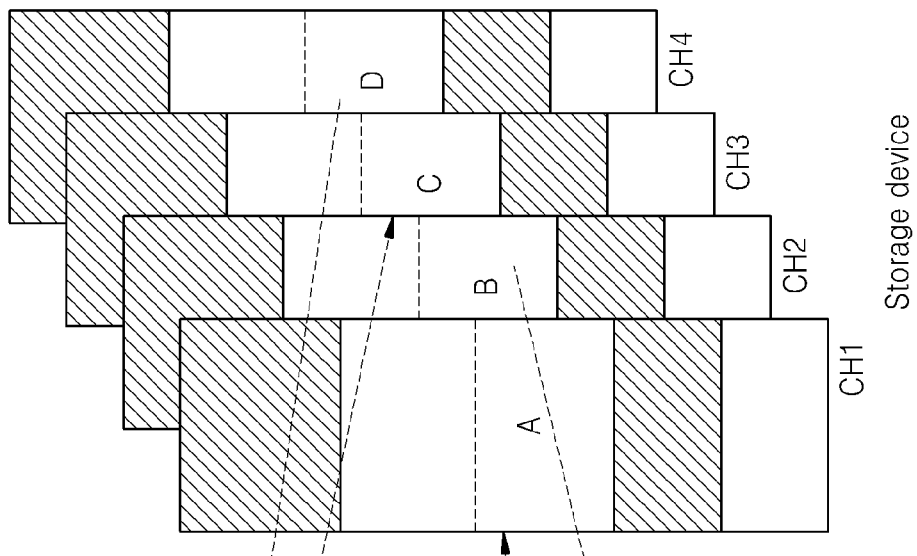
FIGS. 15A, 15B and 15C are diagrams illustrating data transmission according to a memory swapping operation between a random access memory (RAM) (of a main memory) and a storage device in the data processing system, according to an embodiment of the inventive concept.
Figure 15B:
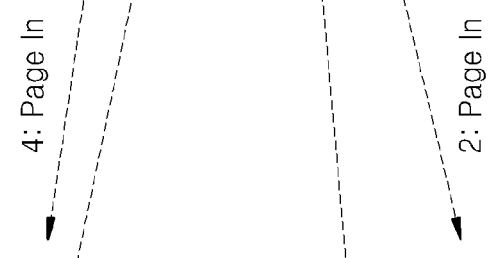
Figure 15A:
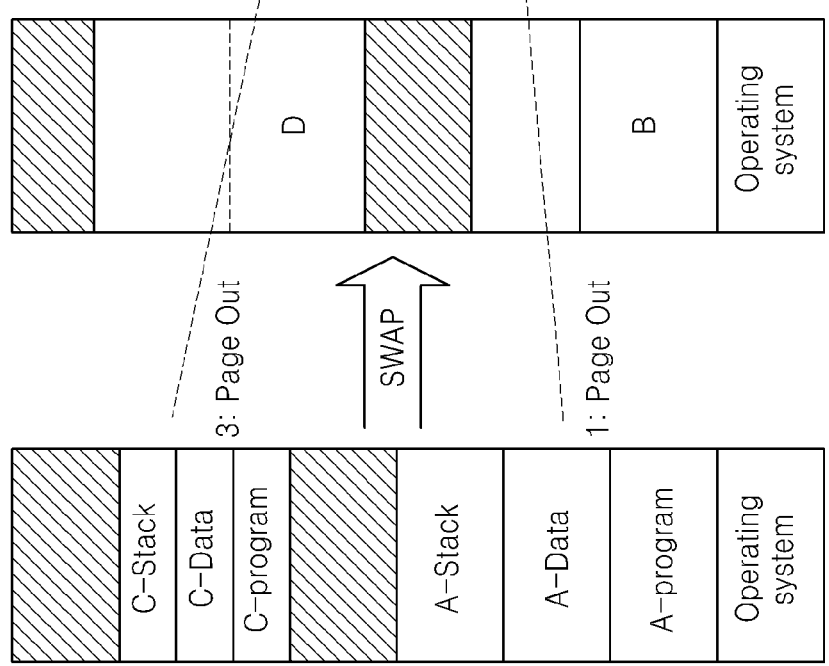

FIGS. 15A, 15B and 15C are diagrams illustrating an example where data is moved between the RAM 2020 and the storage device 2040 in the data processing system 2000 according to a memory swapping operation, according to an embodiment of the inventive concept.

FIG. 15A illustrates a state where the processor 2010 executes a process A and a process C and data for the process A and the process C is loaded into the RAM 2020. For example, the data for the process A includes a program A-Program, data A-Data, and stack information A-Stack that are necessary to perform the process A. The same goes to data for processes B, C, and D.

When there is a request for the process B and the process D which occurs in a state where the data is loaded into the RAM 2020 as shown in FIG. 15A, the data for the process B and the data for the process D are currently not loaded into the RAM 2020. Accordingly, the processor 2010 determines that a page fault occurs. Next, when there is no free storage space for loading the data for the process B or the process D in the RAM 2020, the processor 2010 performs a page-out operation (indicated by numeral 1) by moving and storing the data for the process A that has been loaded into the RAM 2020 to and in a swap space CH1 of the memory device 2042 shown in FIG. 15C, and a page-in operation (indicated by numeral 2) by reading the data for the process B that has been stored in a swap space CH2 of the memory device 2042 and loading the read data into the RAM 2020 as shown in FIG. 15B.

In the same manner, the processor 2010 performs a page-out operation (indicated by numeral 3) by moving and storing the data for the process C that has been loaded into the RAM 2020 to and in a swap space CH3 of the memory device 2042, and a page-in operation (indicated by numeral 4) by reading the data for the process D that has been stored in a swap space CH4 and loading the read data into the RAM 2020 as shown in FIG. 15B.

Referring to FIGS. 15A through 15C, according to a memory swapping operation, the data for the process A is paged out to the memory device 2042, and the data for the process B is paged in from the memory device 2042 to the RAM 2020. Next, the data for the process C is paged out to the memory device 2042, and then the data for the process D is paged in from the memory device 2042 to the RAM 2020.

After the page-out operation and the page-in operation are finished, the data for the process A is stored in the swap space CH1 of the memory device 2042 and the data for the process C is stored in the swap space CH3 of the memory device 2042 as shown in FIG. 15C. Also, the data for the process B and the data for the process D are loaded into the RAM 2020 as shown in FIG. 15B. That is, the data for the process B and the data for the process D are loaded into the RAM 2020 by using a storage space into which the data for the process A and the data for the process C had previously been loaded.

Figure 16:
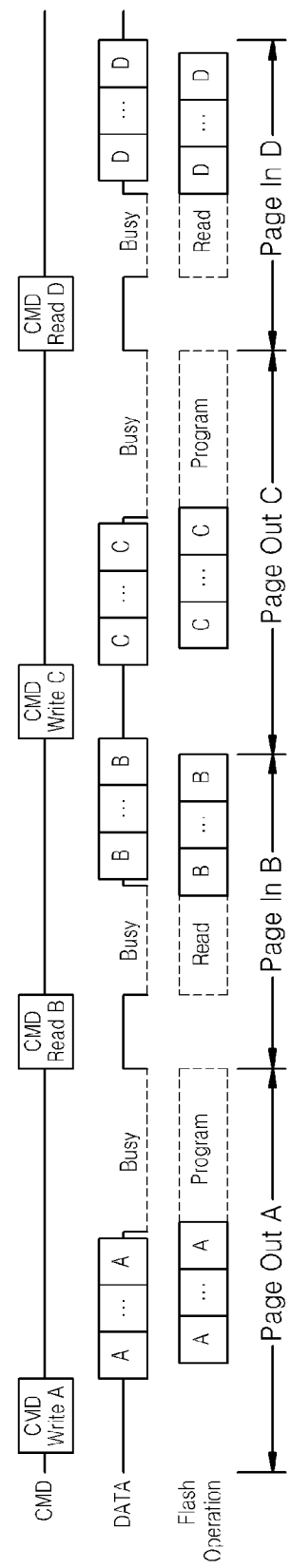
FIG. 16 is a diagram illustrating a memory swapping operation in the data processing system, according to an embodiment of the inventive concept.

FIG. 16 is a diagram illustrating a memory swapping operation in the data processing system 2000, according to an embodiment of the inventive concept. FIG. 16 illustrates an example where a memory swapping operation is performed by using a command CMD according to an eMMC protocol.

For reference, "CMD" in FIGS. 16 through 20 denotes a command bus that connects the processor 2010 and the memory controller 2041, and "DATA" denotes a data bus that connects the processor 2010 and the memory controller 2041. Also, the term "flash operation" refers to an operation that is performed in the storage device 2040. That is, the flash operation refers to an operation that is performed in the storage device 2040 when the memory device 2042 includes flash memory chips.

Referring to FIG. 16, in order to page out data for a process A to the storage device 2040, the processor 2010 transmits data for the process A and a write command CMD Write A to the storage device 2040. Accordingly, the memory controller 2041 of the storage device 2040 recognizes the write command CMD Write A and performs a program operation by storing the data for the process A in the memory device 2042.

Next, in order to page in data for a process B from the storage device 2040 to the RAM 2020, the processor 2010 transmits a read command CMD Read B to the storage device 2040. Accordingly, the memory controller 2041 of the storage device 2040 recognizes the read command CMD Read B and reads the data for the process B from the memory device 2042. The memory controller 2041 transmits the read data for the process B to the processor 2010. Next, the processor 2010 loads the data for the process B into the RAM 2020.

In the same manner, a page-out operation for a process C and a page-in operation for a process D may be performed.

For example, in the data processing system 2000 including the storage device 2040 that is an eMMC, a new command may not be transmitted to the storage device 2040 until multiple write or read operations are finished due to the restriction of the eMMC protocol. Accordingly, as shown in FIG. 16, a page-in operation and a page-out operation for a memory swapping operation are sequentially performed. As a result, a program operation time and a read operation time in the memory device 2041 are directly shown.

FIG. 17 is a diagram illustrating a memory swapping operation in the data processing system 2000, according to another embodiment of the inventive concept. For reference, FIGS. 17 through 22 illustrate new examples where a memory swapping operation is performed by using queue information Q-CMD and a command CMD.

First, in order to page out data for a process A to the storage device 2040, the processor 2010 transmits to the storage device 2040 queue information Q-CMD Write A indicating a next task that an operation for writing the data for the process A is to be performed by using a preset command. Next, the processor 2010 transmits a command CMD Write A to write the data for the process A and the data for the process A to the storage device 2040 via the command bus CMD and the data bus DATA.

Accordingly, the memory controller 2041 of the storage device 2040 recognizes the queue information Q-CMD Write A, and then optimizes an operation of the memory device 2042 by performing address conversion or memory interleaving scheduling to improve write performance by using a method such as a multi-channel operation or interleaving. That is, the memory controller 2041 previously performs at least one selected from the address conversion and the memory interleaving scheduling by using the queue information Q-CMD Write A before a write command is executed.

The memory controller 2041 receives the data for the process A having a preset size or more, and then a program operation is performed in the memory device 2042. For example, when the memory device 2042 includes flash memory chips, a duration "A . . . A" for a first flash memory chip CH1 of a flash operation is a duration for which the data for the process A received from the processor 2010 is stored in the page buffer 15 of the memory device of FIG. 5, and a duration "Program" is a duration for which cells of the memory cell array 11 are programmed based on the data that is stored in the page buffer 15.

Irrespective of whether the operation of writing the data for the process A according to a page-out operation page-out A has been completed, the processor 2010 transmits to the storage device 2040 queue information Q-CMD Read B indicating a next task that an operation of reading data for the process B is to be performed in order to page in the data for the process B by using a preset command. Next, the memory controller 2041 of the storage device 2040 recognizes the queue information Q-CMD Read B, and then the memory controller 2041 performs the operation of reading the data for the process B from the memory device 2042 even during the page-out operation page-out A. That is, the storage device 2040 may previously prepare a page-in operation of the data for the process B by using the queue information Q-CMD Read B. Thus, a read duration for which the data for the process B is read and a program duration for writing the data for the process A may overlap with each other.

For example, when the memory device 2042 is a flash memory device, a duration "Read" for a second flash memory chip CH2 of the flash operation of FIG. 17 is a duration for which data is read from the cells of the memory cell array 11 and is stored in the page buffer 15 of the memory device of FIG. 5, and a duration "B . . . B" is a duration for which data B is output from the page buffer 15 of the memory device 220 and is transferred to and stored in a buffer memory of the memory controller 2041. For example, the buffer memory of the memory controller 2041 corresponds to the RAM 212 of the memory controller 210 of FIG. 4.

Next, the processor 2010 transmits to the storage device 2040 a command CMD Read B to read the data for the process B. For example, the processor 2010 may receive the data for the process B from the storage device 2040 without latency by checking a queue status of the storage device 2040. In detail, the processor 2010 may confirm that an operation of previously reading the data for the process B from the memory device 2041 is ready by checking the queue status of the storage device 2040, and then may transmit to the storage device 2040 the command CMD Read B to read the data for the process B. For example, the processor 2010 may check the queue status of the storage device 2040 by receiving a signal indicating the queue status from the storage device 2040.

As such, since the memory controller 2041 of the storage device 2040 performs address conversion in order for the operation of writing the data for the process A and the operation of reading the data for the process B to be performed in different flash memory chips, a program operation and a read operation may be independently performed. Accordingly, a memory swapping operation time may be reduced by causing a program time of the page-out operation page out A and a read time of the page-in operation page-in B to partially overlap with each other. That is, since the operation for the process B according to the queue information Q-CMD Read B is performed irrespective of whether the operation of writing the data for the process A has been completed, the page-out operation page-out A of the data for the process A and the page-in operation of the data for the process B may be performed in an overlapped manner, thereby improving page-in performance.

A page-out operation of data for a process C and a page-in operation of data for a process D may be performed in the same manner as the page-out operation of the data for the process A and the page-in operation of the data for the process B.

Figure 18:
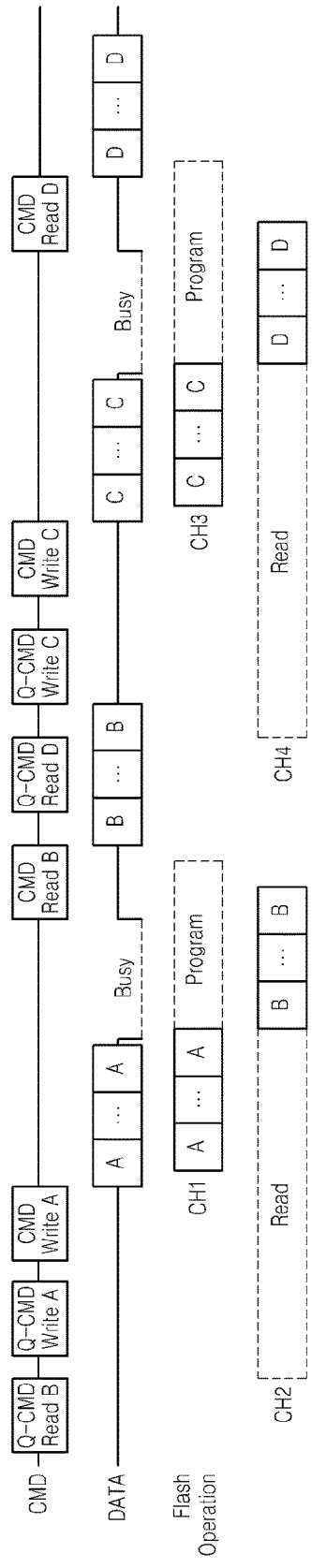
FIG. 18 is a diagram illustrating a memory swapping operation in the data processing system, according to another embodiment of the inventive concept.

FIG. 18 is a diagram illustrating a memory swapping operation in the data processing system 2000, according to another embodiment of the inventive concept.

Referring to FIG. 18, when there is a memory swapping request, the processor 2010 transmits to the storage device 2040 queue information Q-CMD Read for a page-in operation request with a higher priority than queue information Q-CMD Write for a page-out operation request.

When there is a memory swapping request, in order to page in the data for the process B, the processor 2010 transmits to the storage device 2040 queue information Q-CMD Read B indicating a next task that an operation for reading data for a process B is to be performed by using a preset command. Next, the memory controller 2041 of the storage device 2040 recognizes the queue information Q-CMD Read B, and then performs the operation of reading the data for the process B from the memory device 2042. That is, the storage device 2040 may previously prepare a page-in operation of the data for the process B by using the queue information Q-CMD Read B.

Next, in order to page out data for a process A to the storage device 2040, the processor 2010 transmits to the storage device 2040 queue information Q-CMD Write A indicating a next task that an operation of writing the data for the process A is to be performed by using a preset command. Next, the processor 2010 transmits a command CMD Write A to write the data for the process A and the data for the process A to the storage device 2040 via a command bus CMD and a data bus DATA.

Accordingly, the memory controller 2041 of the storage device 2040 recognizes the queue information Q-CMD Write A, and then optimizes an operation of the memory device 2042 by performing address conversion or memory interleaving scheduling to improve write performance by using a method such as a multi-channel operation or interleaving. That is, the memory controller 2041 previously performs at least one selected from the address conversion and the memory interleaving scheduling by using the queue information Q-CMD Write A before a write command is executed. Next, the memory controller 2041 executes the command CMD Write A. That is, the memory controller 2040 receives the data for the process A having a preset size or more, and then a program operation is performed in the memory device 2042.

Next, the processor 2010 transmits to the storage device 2040 a command CMD Read B to read the data for the process B. For example, the processor 2010 may receive from the storage device 2040 the data for the process B without latency by checking a queue status of the storage device 2040. In detail, the processor 2010 may confirm that an operation of previously reading the data for the process B from the memory device 2041 is ready by checking the queue status of the storage device 2040, and then may transmit to the storage device 2040 the command CMD Read B to read the data for the process B.

Accordingly, a program duration for writing the data for the process A and a read duration for reading the data for the process B may overlap with each other.

A page-in operation of data for a process D and a page-out operation of data for a process C may be performed in the same manner as the page-in operation of the data for the process B and the page-out operation of the data for the process A.

Figure 19:
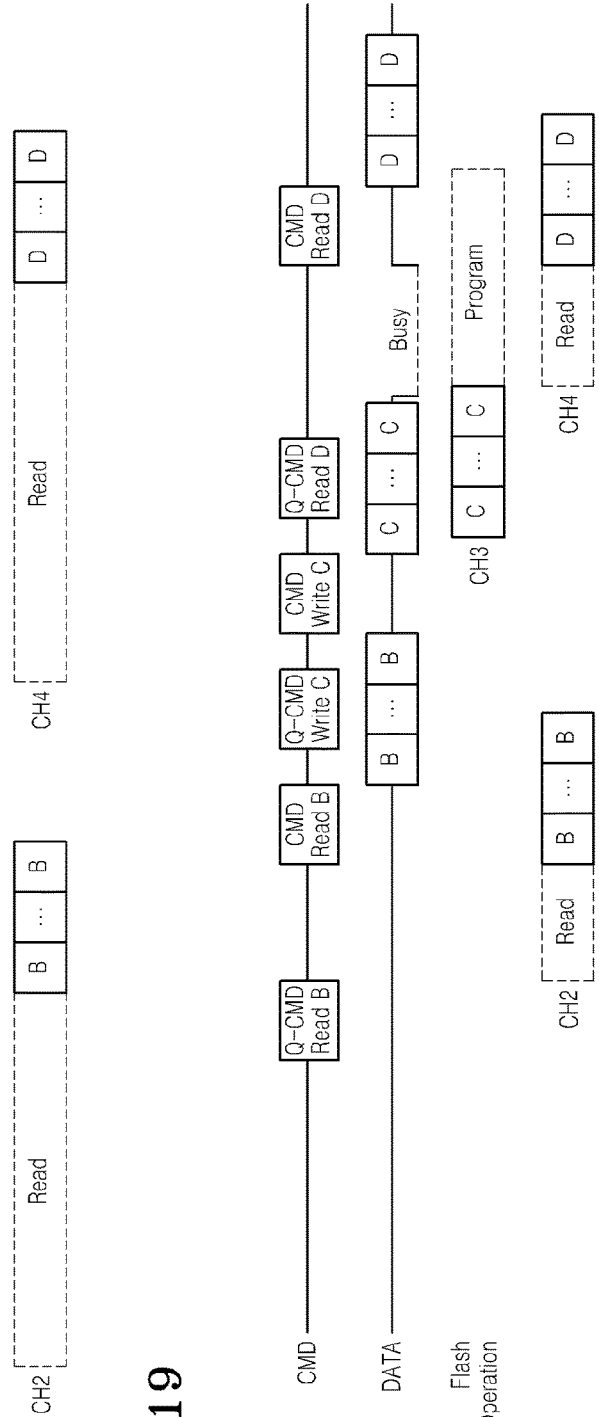
FIG. 19 is a diagram illustrating a memory swapping operation in the data processing system, according to another embodiment of the inventive concept.
Figure 20:
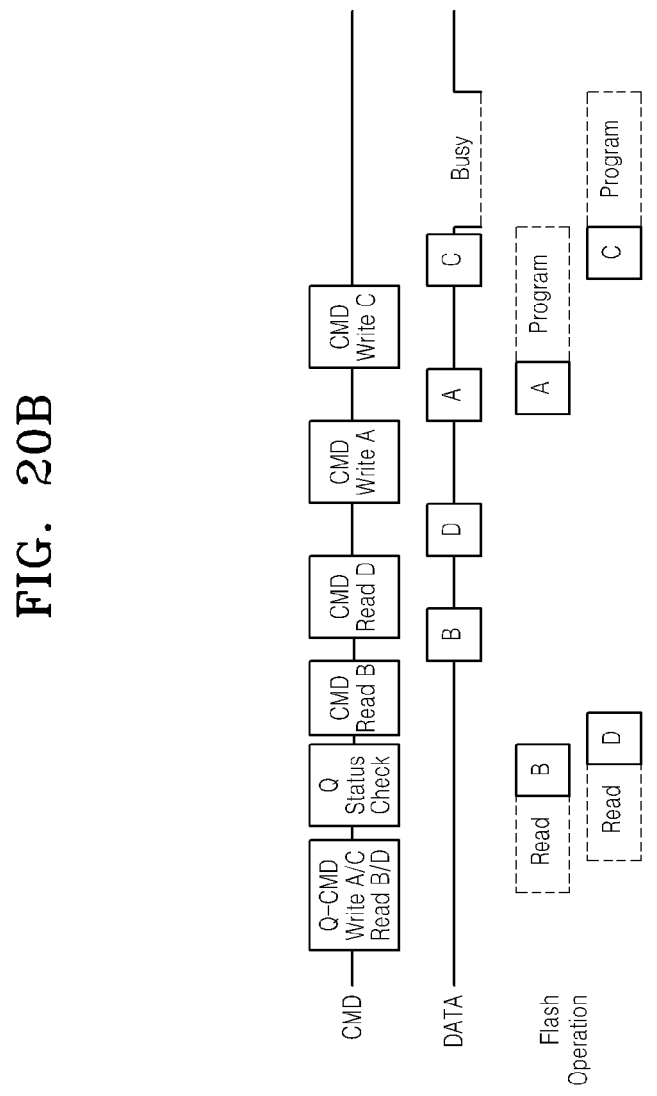
FIGS. 20A and 20B are diagrams illustrating a memory swapping operation in the data processing system, according to another embodiment of the inventive concept.

FIG. 19 is a diagram illustrating a memory swapping operation in the data processing system 2000, according to another embodiment of the inventive concept.

It is assumed that there remains a storage space where data for a process B may be loaded into the RAM 2020 that is a main memory when there is a memory swapping request due to a request according to the process B. In this case, a page-out operation of data for a process A that is stored in the RAM 2020 is not necessary.

Accordingly, a page-in operation of the data for the process B may be directly performed in the data processing system 2000 as shown in FIG. 19.

Under this condition, in order to page in the data for the process B when there is a memory swapping request, the processor 2010 transmits to the storage device 2040 queue information Q-CMD Read B indicating a next task that an operation of reading the data for the process B is to be performed by using a preset command. Next, the memory controller 2041 of the storage device 2040 recognizes the queue information Q-CMD Read B, and then performs the operation of reading the data for the process B from the memory device 2042. That is, the storage device 2040 may previously prepare a page-in operation of the data for the process B by using the queue information Q-CMD Read B.

Next, the processor 2010 transmits to the storage device 2040 a command CMD Read B to read the data for the process B. For example, the processor 2010 may receive the data for the process B from the storage device 2040 without latency by checking a queue status of the storage device 2040. In detail, the processor 2010 may confirm that an operation of previously reading the data for the process from the memory device 2041 is ready by checking the queue status of the storage device 2040, and then may transmit to the storage device 2040 the command CMD Read B to read the data for the process B. For example, the processor 2010 may check the queue status of the storage device 2040 by receiving a signal indicting the queue status from the storage device 2040.

A page-out operation of data for a process C and a page-in operation of data for a process D which are to be performed later may be performed in the same manner as the page-out operation of the data for the process A and the page-in operation of the data for the process B of FIG. 17.

FIGS. 20A and 20B are diagrams illustrating a memory swapping operation in the data processing system 2000, according to another embodiment of the inventive concept. FIGS. 20A and 20B illustrate an example where when a plurality of pieces of queue information Q-CMD are received, a task execution order is re-established and then a memory swapping operation is performed.

As shown in FIG. 20A, when command queue information Q-CMD is transmitted from the processor 2010 to the storage device 2040 in an order of Q-CMD Write A, Q-CMD Read B, Q-CMD Write C, and Q-CMD Write D, the memory controller 2041 of the storage device 2040 may re-establish a task execution order for a memory swapping operation by using the received pieces of command queue information Q-CMD. For example, the memory controller 2041 may re-establish the task execution order for the memory swapping operation based on priority information that is included in the command queue information Q-CMD. Alternatively, the memory controller 2041 may re-establish the task execution order by allocating a higher priority to a page-in operation than to a page-out operation. Alternatively, the memory controller 2041 may re-establish the task execution order to continuously perform a plurality of read operations and continuously perform a plurality of write operations.

As shown in FIGS. 20A and 20B, the memory controller 2041 of the storage device 2040 re-establishes the task execution order by allocating a higher priority to a read operation, and then previously performs an operation of reading data for a process B and an operation of reading data for a process D from the memory device 2042 based on the command information Q-CMD Read B and Q-CMD Read D.

The processor 2010 confirms that a queue operation is ready by checking a queue status of the storage device 2040, and then sequentially transmits read commands CMD Read B and CMD Read D corresponding to the ready queue information Q-CMD Read B and Q-CMD Read D to the memory controller 2041. The memory controller 2041 recognizes CMD Read B and CMD Read D, and sequentially transmits the read data for the process B and the read data for the process D to the processor 2010. Next, the processor 2010 loads the data for the process B and the data for the process D into the RAM 2020.

Next, the processor 2010 sequentially transmits a write command CMD Write A and data for a process A, and a write command CMD Write C and data for a process C to the memory controller 2041 of the storage device 2040. Next, the memory controller 2041 performs a program operation for writing the data for the process A and the data for the process C to the memory device 2042.

Figure 21:
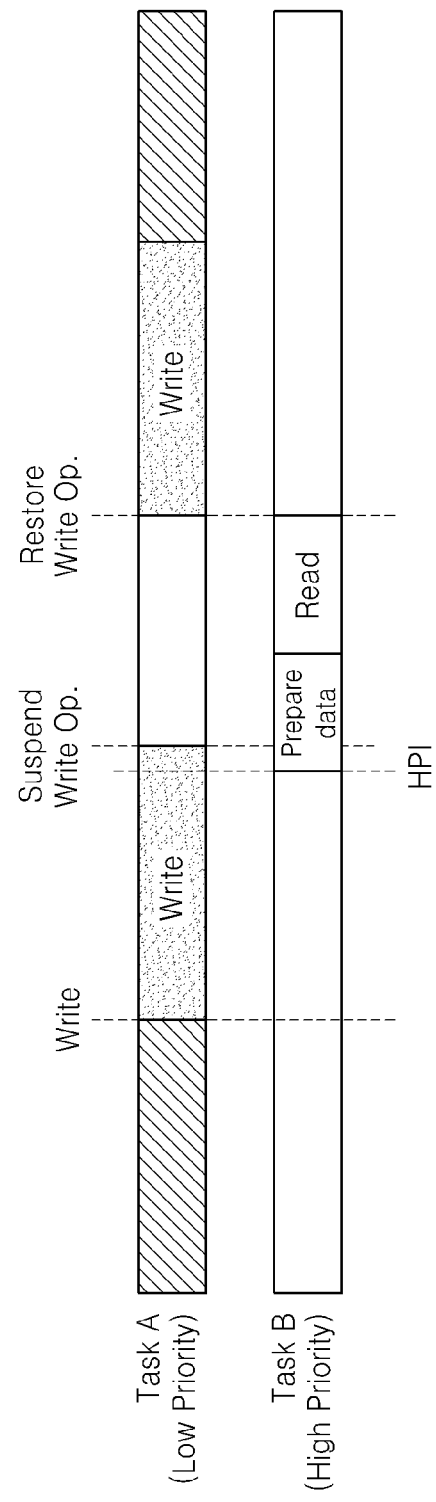
FIG. 21 is a diagram illustrating a task execution state according to a high priority interrupt (HPI) operation in a multimedia card system related to the inventive concept.

FIG. 21 is a diagram illustrating a task execution state according to a high priority interrupt (HPI) operation in a multimedia card system related to the inventive concept.

The processor 2010 may request the memory controller 2041 of the storage device 2040 for an HPI for a fast page-in operation. In the data processing system 2000 including an eMMC, the processor 2010 may make the requests for the HPI without knowing a state of the storage device 2040. In this case, the storage device 2040 may receive the HPI in a state where an operation such as garbage collection is being performed on the memory device 2042. Accordingly, a time when the storage device 2040 may handle the HPI may be delayed.

Also, as shown in FIG. 21, after the HPI operation is finished, a process of determining how much data is programmed during a previous write operation and re-writing (restoring) data that is not yet programmed is necessary. Since the processor 2010 may not accurately predict a response time to the HPI operation, a page-in operation may not be performed at a desired time.

According to the inventive concept, however, a signal indicating a queue status of the storage device 2040 is generated and is transmitted to the processor 2010 in order to quickly and accurately perform a page-in operation.

Figure 22:
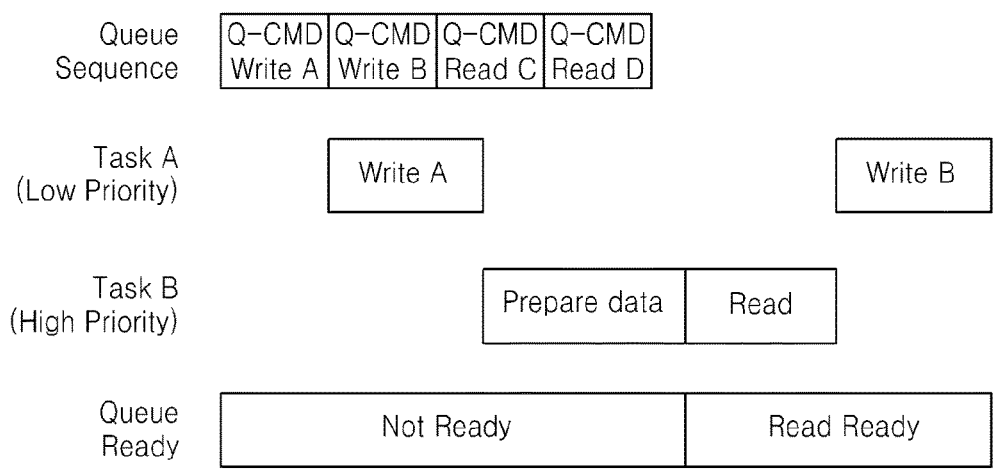
FIG. 22 is a diagram for explaining a memory swapping operation based on a queue status of the storage device in the data processing system, according to an embodiment of the inventive concept.

FIG. 22 is a diagram for explaining a memory swapping operation based on a queue status of the storage device 2040 in the data processing system 2000, according to an embodiment of the inventive concept.

Referring to FIG. 22, command queue information Q-CMD is transmitted from the processor 2010 to the storage device 2040 in an order of Q-CMD Write A, Q-CMD Write B, Q-CMD Read C, and Q-CMD Read D. For example, in a state where the storage device 2040 is performing a task of writing data for a process A based on the queue information Q-CMD Write A, the processor 2010 may sequentially transmit to the storage device 2040 the queue information Q-CMD Read C and Q-CMD Read D indicating that data for a process C and data for a process D are to be read. In this case, the processor 2010 may inform the storage device 2040 that a task for a read operation has a higher priority by using priority information included in the queue information Q-CMD.

Next, the storage device 2040 performs scheduling and re-ordering on tasks based on the queue information Q-CMD. Accordingly, the storage device 2040 firstly performs a task operation having a higher priority when internal operations are organized. Referring to FIG. 22, the storage device 2040 ends an operation of writing the data for the process A, and then performs an operation of reading the data for the process C and the data for the process D having a higher priority before performing an operation of writing data for a process B.

Next, the storage device 2040 transmits a signal indicating a queue status to the processor 2010. Accordingly, the processor 2010 may detect a time when a queue operation is ready in the storage device 2040 by using the signal indicating the queue status received from the storage device 2040. That is, the processor 2010 may detect a time when a page-in operation or a page-out operation for the queue information Q-CMD is ready by using the signal indicating the queue status.

For example, since the processor 2010 recognizes the time when the page-in operation for the queue information Q-CMD in the storage device 2040 is ready by using the signal indicating the queue status and then transmits a read command to the storage device 2040, the data for the process C and the data for the process D may be received from the storage device 2040 without latency.

Figure 23:
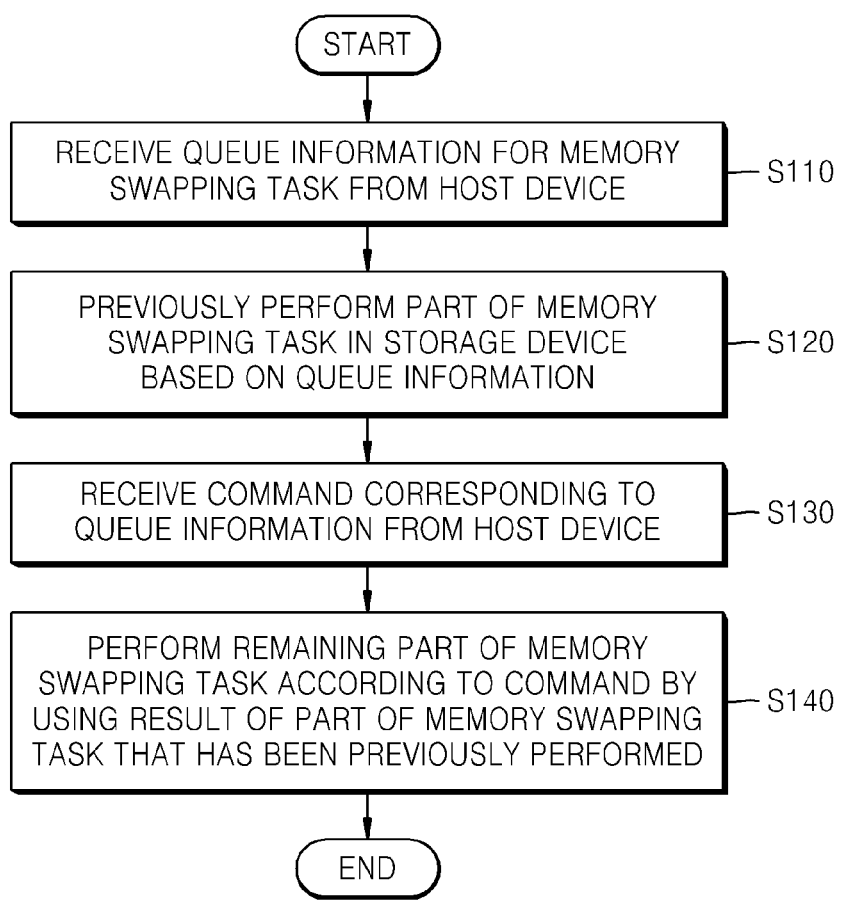
FIG. 23 is a flowchart illustrating a memory swapping method according to an embodiment of the inventive concept.

FIG. 23 is a flowchart illustrating a memory swapping method according to an embodiment of the inventive concept.

For example, the memory swapping method shown in FIG. 23 is performed in the data processing system 1000 of FIGS. 1 and 2 or the data processing system 2000 of FIG. 13. For convenience of explanation, the memory swapping method performed in the data processing system 1000 shown in FIGS. 1 and 2 will be explained with reference to FIG. 23.

In operation S110, the storage device 200 receives queue information Q-CMD for a memory swapping task from the host device 100. For example, when a page fault occurs in the host device 100, the processor 110 may transmit the queue information Q-CMD for the memory swapping task to the storage device 200. The page fault occurs when a page to be read in order to perform an application process in the host device 100 is not stored in the host device 100. For example, the queue information Q-CMD may include queue information for at least one selected from a page-in operation and a page-out operation for a memory swapping operation. For example, the queue information Q-CMD may be information indicating a task for a read command or a write command to perform at least one selected from a page-in operation and a page-out operation for the memory swapping operation.

In detail, queue information Q-CMD Write A indicating a task for the page-out operation for moving and storing data for a process A that is loaded into the main memory 120 to and in the storage device 200 may be transmitted as the queue information Q-CMD to the storage device 200. Alternatively, queue information Q-CMD Read B indicating a task for the page-in operation for loading data for a process B that is stored in the storage device 200 into the main memory 120 may be transmitted as the queue information Q-CMD to the storage device 200.

Next, in operation S120, the storage device 200 previously performs part of the memory swapping task based on the queue information Q-CMD that is received from the host device 100. For example, the storage device 200 may previously perform part of at least one selected from the page-out operation and the page-in operation of the memory swapping task based on the queue information Q-CMD. For example, the storage device 200 may previously perform the page-in operation in the storage device 200 by causing a program time of the page-out operation and a read time of the page-in operation to partially overlap with each other.

In operation S130, the storage device 200 having previously performed the part of the memory swapping task receives a command CMD corresponding to the queue information Q-CMD from the host device 100. The host device 100 may transmit the command CMD when a queue status of the storage device 200 is ready. For example, the host device 100 may transmit the command CMD when the queue status indicates that the part of the memory swapping task based on the queue information Q-CMD has been completed.

Next, in operation S140, the storage device 200 performs a remaining part of the memory swapping task according to the received command CMD by using a result of the part of the memory swapping task that has previously been performed. For example, assuming that a data read operation according to the page-in operation is previously performed in the storage device 200, when the storage device 200 receives a read command for performing the page-in operation, the storage device 200 may directly transmit the previously read data to the host device 100. For example, the storage device 200 may store the previously read data in the page buffer 15 of the memory device 220 (shown in FIG. 5) or the RAM 212 of the memory controller 210 (shown in FIG. 4) by using the queue information Q-CMD. Next, when the storage device 200 receives a read command corresponding to the queue information Q-CMD, the storage device 200 may read the data from the page buffer 15 of the memory device 220 or the RAM 212 of the memory controller 210 and may transmit the read data to the host device 100.

Figure 24:
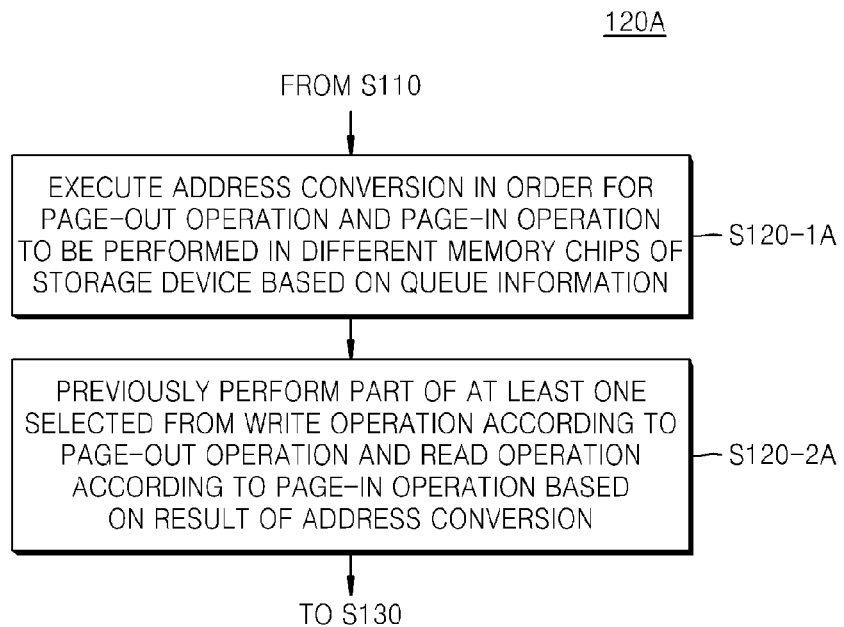
FIG. 24 is a detailed flowchart illustrating an operation of previously performing part of a memory swapping task in the memory swapping method shown in FIG. 23, according to an embodiment of the inventive concept.

FIG. 24 is a detailed flowchart illustrating operation S120A corresponding to operation S120 of previously performing the part of the memory swapping task in the memory swapping method shown in FIG. 23, according to an embodiment of the inventive concept.

In operation S120-1A, the memory controller 210 of the storage device 200 executes address conversion in order for the page-out operation and the page-in operation for the memory swapping task to be performed in different memory chips of the storage device 200 based on the received queue information Q-CMD. For example, the memory controller 210 may execute the address conversion to perform the page-out operation and the page-in operation in different memory chips by using memory interleaving scheduling.

In operation S120-2A, the memory controller 210 previously performs part of at least one selected from a write operation according to the page-out operation and a read operation according to the page-in operation based on a result of the address conversion. For example, the memory controller 210 may previously perform the page-in operation by causing a program time of the page-out operation and a read time of the page-in operation to partially overlap with each other.

Figure 25:
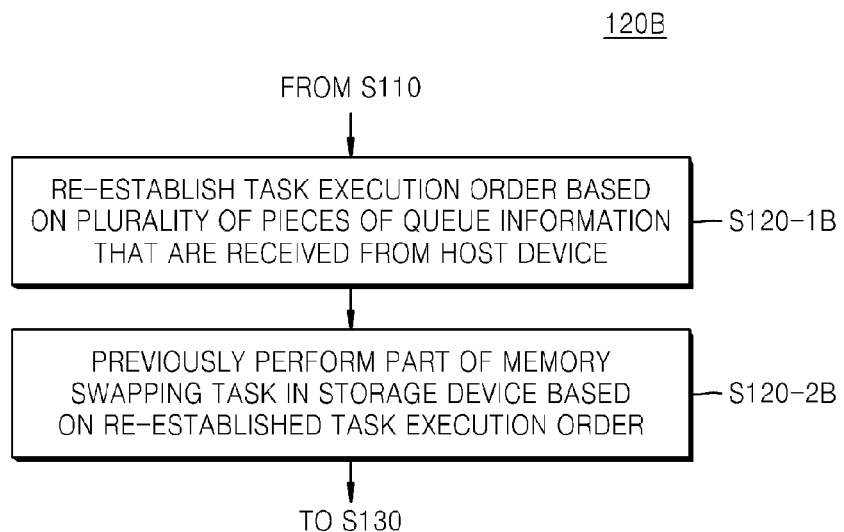
FIG. 25 is a detailed flowchart illustrating an operation of previously performing part of the memory swapping task in the memory swapping method shown in FIG. 23, according to another embodiment of the inventive concept.

FIG. 25 is a detailed flowchart illustrating operation S120B corresponding to operation S120 of previously performing the part of the memory swapping task in the memory swapping method shown in FIG. 23, according to another embodiment of the inventive concept.

In operation S120-1B, the memory controller 210 of the storage device 200 re-establishes a task execution order based on a plurality of pieces of the queue information Q-CMD that are received from the host device 100. For example, the memory controller 210 may re-establish the task execution order based on priority information included in the received plurality of pieces of queue information Q-CMD.

In operation S120-2B, the memory controller 210 controls the memory device 220 to previously perform the part of the memory swapping task in the storage device 200 based on the re-established task execution order.

Figure 26:
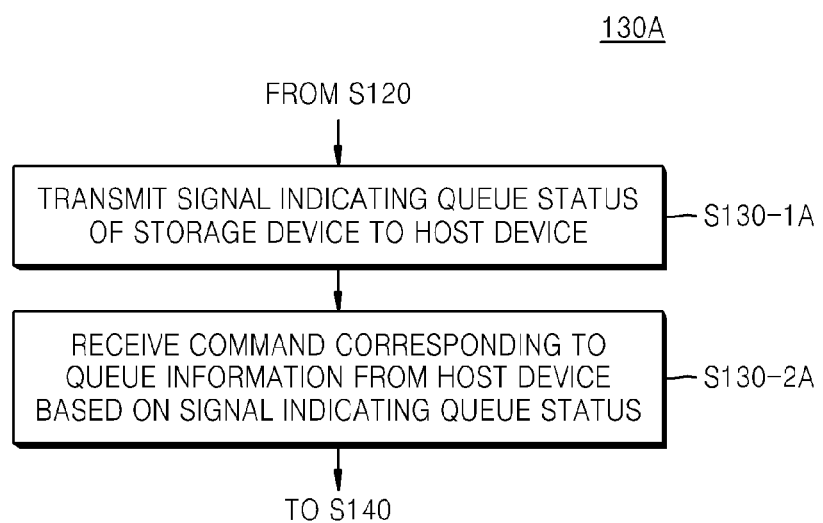
FIG. 26 is a detailed flowchart illustrating an operation of receiving a command in the memory swapping method shown in FIG. 23, according to an embodiment of the inventive concept.

FIG. 26 is a detailed flowchart illustrating operation S130A corresponding to operation S130 of receiving the command CMD in the memory swapping method shown in FIG. 23, according to an embodiment of the inventive concept.

In operation S130-1A, the memory controller 210 transmits a signal indicating a queue status of the storage device 200 to the host device 100. For example, the memory controller 210 may transmit a signal indicating that a queue of the storage device 200 is ready to the host device 100 after the part of the memory swapping task according to the queue information Q-CMD in the storage device 200 is completed.

In operation S130-2A, the storage device 200 receives the command CMD corresponding to the queue information Q-CMD from the host device 100 based on the signal indicating the queue status. For example, the host device 100 may confirm that the queue of the storage device 200 is ready and then may transmit the command CMD corresponding to the queue information Q-CMD to the storage device 200. In detail, after confirming that an operation of previously reading the data for the process B is completed and is ready by checking the queue status of the storage device 200, the host device 100 may transmit to the storage device 200 a command CMD Read B to read the data for the process B.

Figure 27:
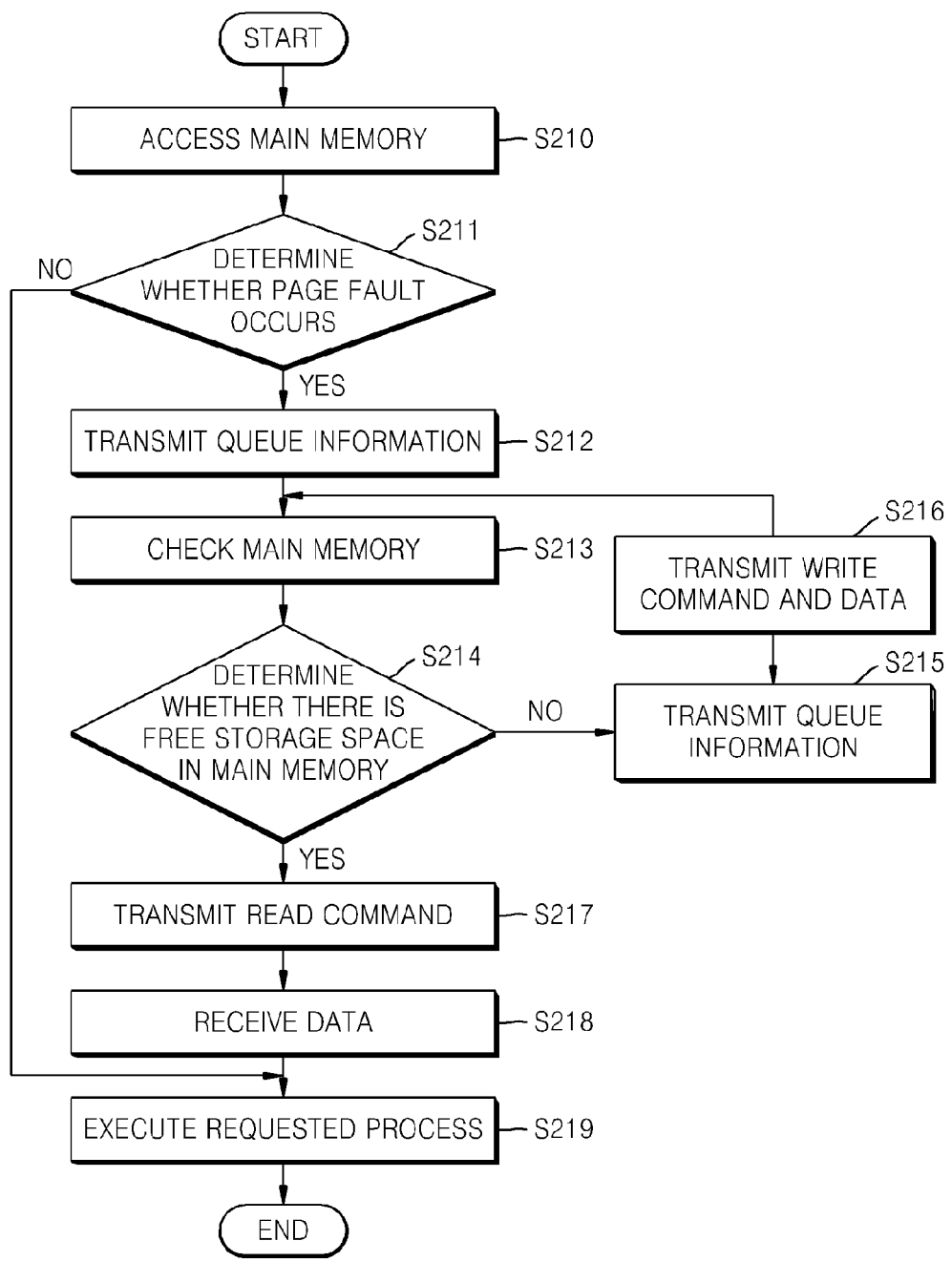
FIG. 27 is a flowchart illustrating a memory swapping operation that is performed in a host device of the data processing system, according to an embodiment of the inventive concept.

FIG. 27 is a flowchart illustrating a memory swapping operation that is performed in the host device 110 of the data processing system 1000, according to an embodiment of the inventive concept.

In operation S210, the processor 110 of the host device 100 accesses the main memory 120 according to a new process request.

In operation S211, the processor 110 determines whether a page fault occurs during the access to the main memory 120.

When it is determined in operation S211 that the page fault occurs, the memory swapping operation proceeds to operation S212. In operation S212, the processor 110 transmits to the storage device 200 queue information Q-CMD for a read request for performing a page-in operation. The term "page-in operation" refers to a task of reading a page in which the page fault occurs from the storage device 200 and loading the read page into the main memory 120. Accordingly, the queue information Q-CMD for the page-in operation is queue information Q-CMD READ for the task of reading the page with the page fault from the storage device 200. For example, the queue information Q-CMD may be transmitted to the storage device 200 by using a preset command.

In operation S213, the processor 110 checks the main memory 120. For example, the processor 110 checks an empty storage space of the main memory 120.

In operation S214, the processor 110 determines whether the page with the page fault may be stored in the empty storage space of the main memory 120. That is, the processor 110 may determine whether a free storage space for storing the page with the page fault exists in the main memory 120.

If it is determined in operation S214 that the free storage space in which the page with the page fault may be stored does not exist in the main memory 120, the memory swapping operation proceeds to operation S215. In operation S215, the processor 110 transmits queue information Q-CMD WRITE for a write request for performing a page-out operation to the storage device 200.

Next, in operation S216, the processor 110 transmits data and a write command for the write request for performing the page-out operation to the storage device 200. The transmitted data is data read from the main memory 120. For example, the transmitted data corresponds to data that is to be removed in order to secure a storage space in the main memory 120. For example, the processor 110 may confirm that a queue of the storage device 200 is ready and then may transmit a command CMD WRITE corresponding to the queue information Q-CMD WRITE to the storage device 200.

When it is determined in operation S214 that the free storage space in which the page with the page fault may be stored exists in the main memory 120, the memory swapping operation proceeds to operation S217. In operation S217, the processor 110 transmits a read command for a read request for performing the page-in operation to the storage device 200. For example, the processor 110 may confirm that a previous operation for the queue information Q-CMD READ in the storage device 110 is completed and the queue of the storage device 200 is ready, and then may transmit a command CMD READ corresponding to the queue information Q-CMD READ to the storage device 200.

In operation S218, the processor 110 receives data from the storage device 200 according to the read command. The data received from the storage device 200 is loaded into the main memory 120.

Next, in operation S219, the processor 110 performs a new requested process by using the data that is loaded into the main memory 120. If it is determined in operation S211 that the page fault does not occur, the memory swapping operation proceeds to operation S219.

Figure 28:
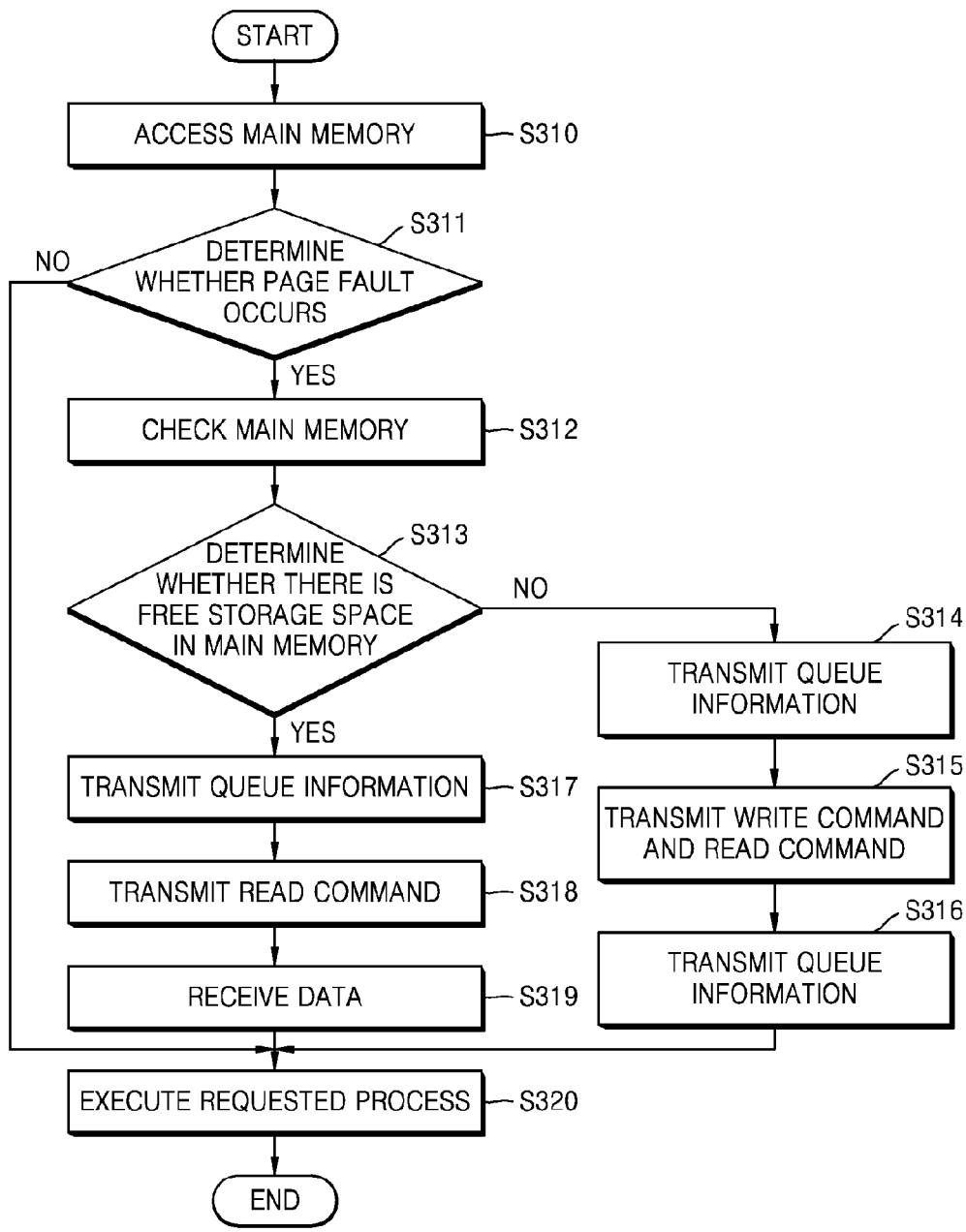
FIG. 28 is a flowchart illustrating a memory swapping operation that is performed in the host device of the data processing system, according to another embodiment of the inventive concept.

FIG. 28 is a flowchart illustrating a memory swapping operation that is performed in the host device 100 of the data processing system 1000, according to another embodiment of the inventive concept.

In operation S310, the processor 110 of the host device 100 accesses the main memory 120 according to a new process request.

In operation S311, the processor 110 determines whether a page fault occurs during the access to the main memory 120.

When it is determined in operation S311 that the page fault occurs, the memory swapping operation proceeds to operation S312. In operation S312, the processor 110 checks the main memory 120. For example, the processor 110 checks an empty storage space of the main memory 120.

In operation S313, the processor 110 determines whether a page in which the page fault occurs may be stored in the empty storage space of the main memory 120. That is, the processor 110 determines whether a free storage space in which the page with the page fault may be stored exists in the main memory 120.

If it is determined in operation S313 that the free storage space in which the page with the page fault may be stored does not exist in the main memory 120, the memory swapping operation proceeds to operation S314. In operation S314, the processor 110 sequentially transmits queue information Q-CMD WRITE and Q-CMD READ for a write request and a read request for performing a page-out operation and a page-in operation to the storage device 200.

Next, in operation S315, the processor 110 sequentially transmits a write command for the write request for performing the page-out operation, and a read command for the read request for performing the page-in operation to the storage device 200. For example, the processor 110 may determine whether a queue of the storage device 200 is ready and then may transmit a command CMD corresponding to queue information Q-CMD to the storage device 200.

Next, in operation S316, the processor 110 transmits data to be written to the storage device 200 according to the write command and receives data read from the storage device 200 according to the read command. The data transmitted to the storage device 200 is data read from the main memory 120 and corresponds to data to be removed in order to secure a storage space in the main memory 120. The data received from the storage device 200 that is data with a page fault is loaded into the main memory 120.

When it is determined in operation S313 that the free storage space in which the page with the page fault may be stored exists in the main memory 120, the memory swapping operation proceeds to operation S317. In operation S317, the processor 110 transmits the queue information Q-CMD READ for the read request for performing the page-in operation to the storage device 200. The term "page-in operation" refers to a task of reading the page with the page fault from the storage device 200 and loading the read page with the page fault into the main memory 120.

Next, in operation S318, the processor 110 transmits the read command for the read request for performing the page-in operation to the storage device 200.

In operation S319, the processor 110 receives data from the storage device 200 according to the read command. The received data is loaded into the main memory 120.

Next, in operation S320, the processor 110 performs a new requested process by using the data that is loaded into the main memory 120. If it is determined in operation S311 that the page fault does not occur, the memory swapping operation directly proceeds to operation S320.

Alternatively, operation S317 may be omitted. In this case, an operation of transmitting to the storage device 200 the queue information Q-CMD in the memory swapping operation that needs only the page-in operation may be omitted.

Alternatively, the processor 110 may transmit the queue information Q-CMD and the command CMD based on the order of FIGS. 17 through 20 by combining operations S314 through S316.

Figure 29:
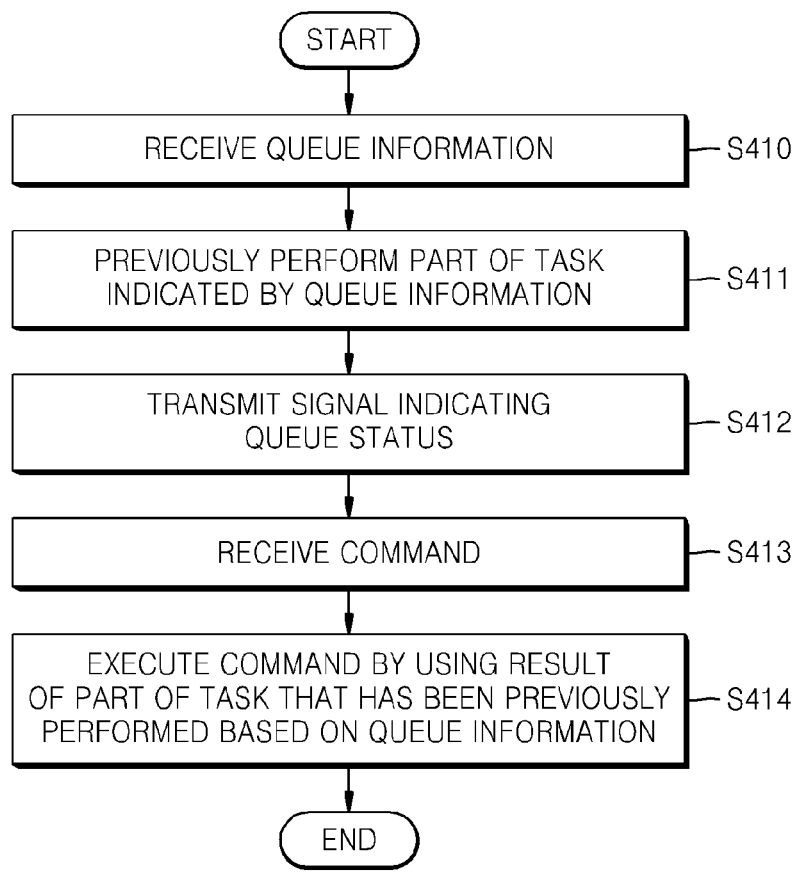
FIG. 29 is a flowchart illustrating a memory swapping operation that is performed in the storage device of the data processing system, according to an embodiment of the inventive concept.

FIG. 29 is a flowchart illustrating a memory swapping operation that is performed in the storage device 200 of the data processing system 1000, according to an embodiment of the inventive concept.

In operation S410, the memory controller 210 of the storage device 200 receives queue information Q-CMD from the host device 100. For example, the queue information Q-CMD may be transmitted from the host device 100 by using a preset command. The queue information Q-CMD may be information indicating a task for a read command or a write command to perform at least one selected from a page-in operation and a page-out operation for a memory swapping operation. Also, the queue information Q-CMD may include information about an attribute of data.

In operation S411, the memory controller 210 controls the storage device 200 to previously perform part of the task indicated by the queue information Q-CMD that is received from the host device 100. For example, the memory controller 210 may control the storage device 200 to previously perform part of a memory swapping task based on the queue information Q-CMD. In detail, the memory controller 210 may previously perform at least one selected from a write operation according to the page-out operation and a read operation according to the page-in operation based on the queue information Q-CMD. The memory controller 210 may control the storage device 200 to previously perform the page-in operation by causing a program time of the page-out operation and a read time of the page-in operation to partially overlap with each other.

Next, in operation S412, the memory controller 210 transmits a signal indicating a queue status of the storage device 200 to the host device 100. For example, the memory controller 210 transmits to the host device 100 a signal indicating that a queue of the storage device 200 is ready after the part of the memory swapping task according to the queue information Q-CMD is completed.

Next, in operation S413, the memory controller 210 receives a command CMD corresponding to the queue information Q-CMD from the host device 100. For example, the memory controller 210 receives at least one selected from a write command corresponding to a task for the page-out operation and a read command corresponding to a task for the page-in operation from the host device 100.

Next, in operation S414, the memory controller 210 executes the received command CMD by using a result of the part of the task that has been previously performed based on the queue information Q-CMD.

Figure 30:
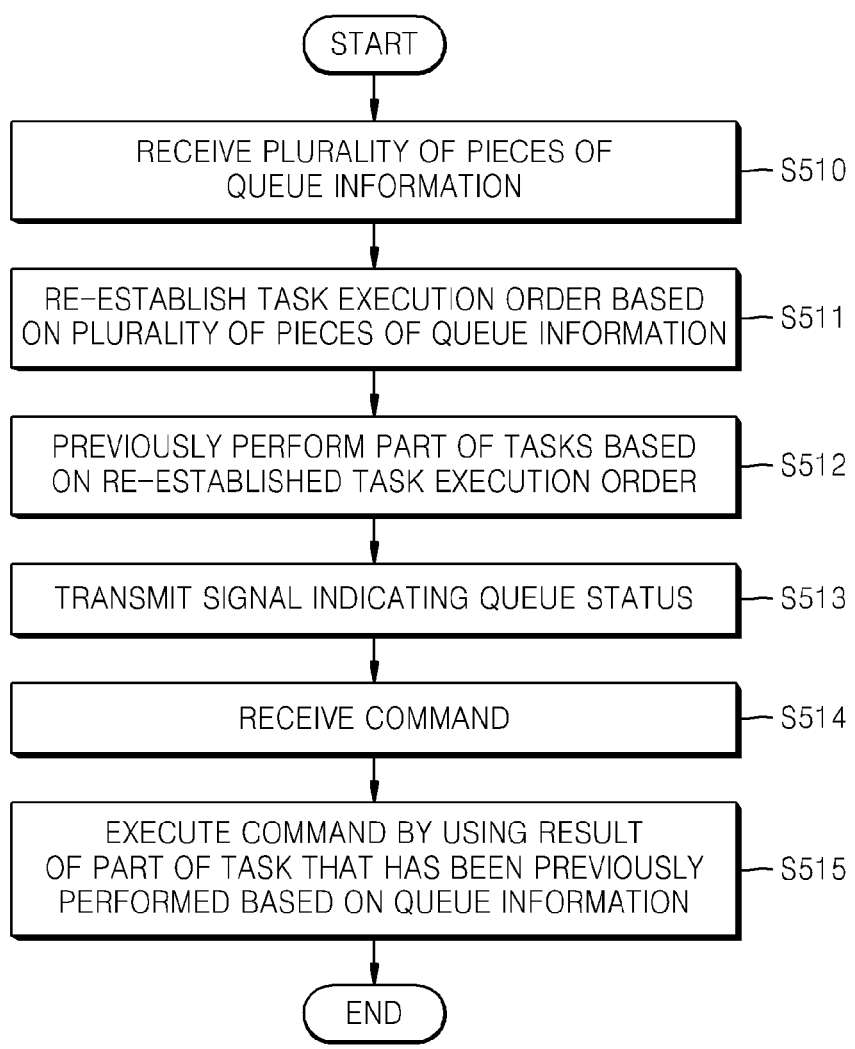
FIG. 30 is a flowchart illustrating a memory swapping operation that is performed in the storage device of the data processing system, according to another embodiment of the inventive concept.

FIG. 30 is a flowchart illustrating a memory swapping operation that is performed in the storage device 200 of the data processing system 1000, according to another embodiment of the inventive concept.

In operation S510, the memory controller 210 of the storage device 200 sequentially receives a plurality of pieces of queue information Q-CMD from the host device 100.

In operation S511, the memory controller 210 re-establishes a task execution order based on the plurality of pieces of queue information Q-CMD that are received from the host device 100. For example, the memory controller 210 may re-establish the task execution order based on priority information that is included in the received plurality of pieces of queue information Q-CMD.

In operation S512, the memory controller 210 controls the memory device 220 to previously perform part of a memory swapping task in the storage device 200 based on the re-established task execution order.

Next, in operation S513, the memory controller 210 transmits a signal indicating a queue status of the storage device 200 to the host device 100. For example, the memory controller 210 transmits to the host device 100 a signal indicating that a queue of the storage device 200 is ready after the part of the memory swapping task according to the queue information Q-CMD is completed.

Next, in operation S514, the memory controller 210 receives a command CMD corresponding to the queue information Q-CMD from the host device 100. For example, the memory controller 210 receives from the host device 100 at least one selected from a write command corresponding to a task for a page-out operation and a read command corresponding to a task for a page-in operation.

Next, in operation S515, the memory controller 210 executes the received command CMD by using a result of the part of the task that has been previously performed based on the queue information Q-CMD.

Figure 31:
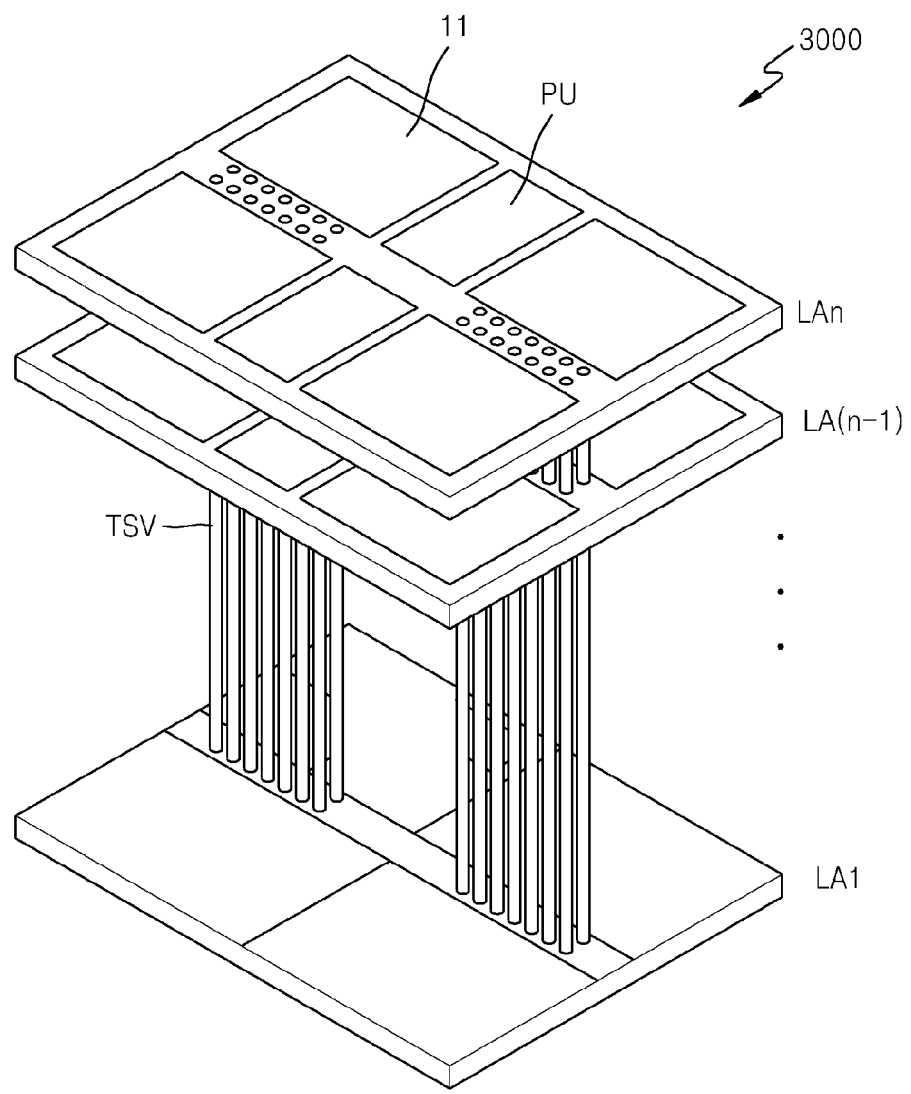
FIG. 31 is a perspective view illustrating a memory device that is applied to the storage device of the data processing system, according to an embodiment of the inventive concept.

FIG. 31 is a perspective view illustrating a memory device 3000 that may be applied to the storage device 200 of the data processing system 1000, according to an embodiment of the inventive concept.

As shown in FIG. 31, the memory device 3000 may be formed by stacking a plurality of semiconductor layers, e.g., first through nth semiconductor layers LA1 through LAn. Each of the first through nth semiconductor layers LA1 through LAn may be a chip including the memory device 220 of FIG. 2, or some of the first through nth semiconductor layers LA1 through LAn may be master chips that interface with an external memory controller and the remaining ones of the first through nth semiconductor layers LA1 through LAn may be slave chips including the memory cell array 11 of FIG. 5. In FIG. 31, the first semiconductor layer LA1 that is a lowermost semiconductor layer may be a master chip, and the remaining second through nth semiconductor layers LA2 through LAn may be slave chips.

The first through nth semiconductor layers LA1 through LAn transmit/receive signals to/from one another via through-silicon vias (TSVs), and the first semiconductor layer LA1 communicates with the external memory controller by using a conductive unit (not shown) that is formed on an outer surface of the first semiconductor layer LA1. A structure and an operation of the memory device 3000 will be explained focusing on the first semiconductor layer LA1 that is a master chip and the nth semiconductor layer LAn that is a slave chip. The first semiconductor layer LA1 drives the memory cell array 11 that is provided in slave chips. The first semiconductor layer LA1 may include logic for receiving data, an address, and a command from the external memory controller and transmitting the data, the address, and the command to a slave chip, and may include logic for transmitting data received from each slave chip to the external memory controller. Each semiconductor layer, for example, the nth semiconductor layer LAn, may include the memory cell array 11 and a peripheral circuit PU for driving the memory cell array 11. For example, the memory cell array 11 of each slave chip may be the memory cell array 11 of FIG. 5, and the control logic 12, the voltage generator 13, the row decoder 14, and the page buffer circuit 15 of FIG. 5 may be included in the peripheral circuit PU of each slave chip.

Figure 32:
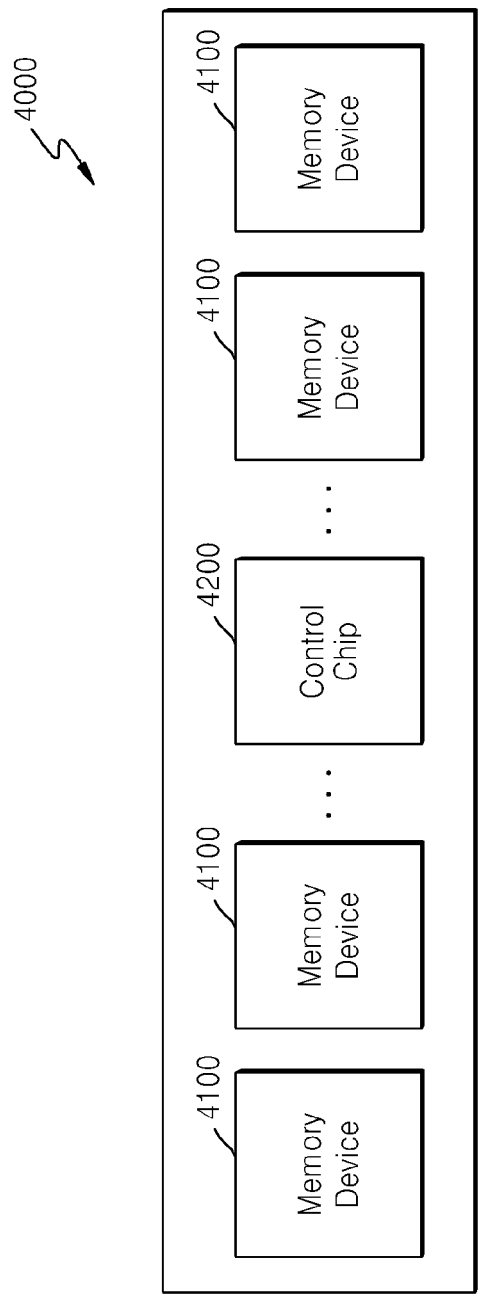
FIG. 32 is a diagram illustrating a memory module that is applied to the storage device of the data processing system, according to an embodiment of the inventive concept.

FIG. 32 is a diagram illustrating a memory module 4000 that may be applied to the storage device 200 of the data processing system 1000, according to an embodiment of the inventive concept.

Referring to FIG. 32, the memory module 4000 may include memory chips 4100 and a control chip 4200. The memory chips 4100 may store data. For example, each of the memory chips 4100 may be the memory device 220 of FIG. 2. The control chip 4200 may control the memory chips 4100 in response to various signals that are transmitted from an external memory controller. For example, the control chip 4200 may activate one memory chip 4100 corresponding to a chip selection signal that is transmitted from the outside, and may perform error checking and correction on data that is read from the memory chip 4100.

Figure 33:
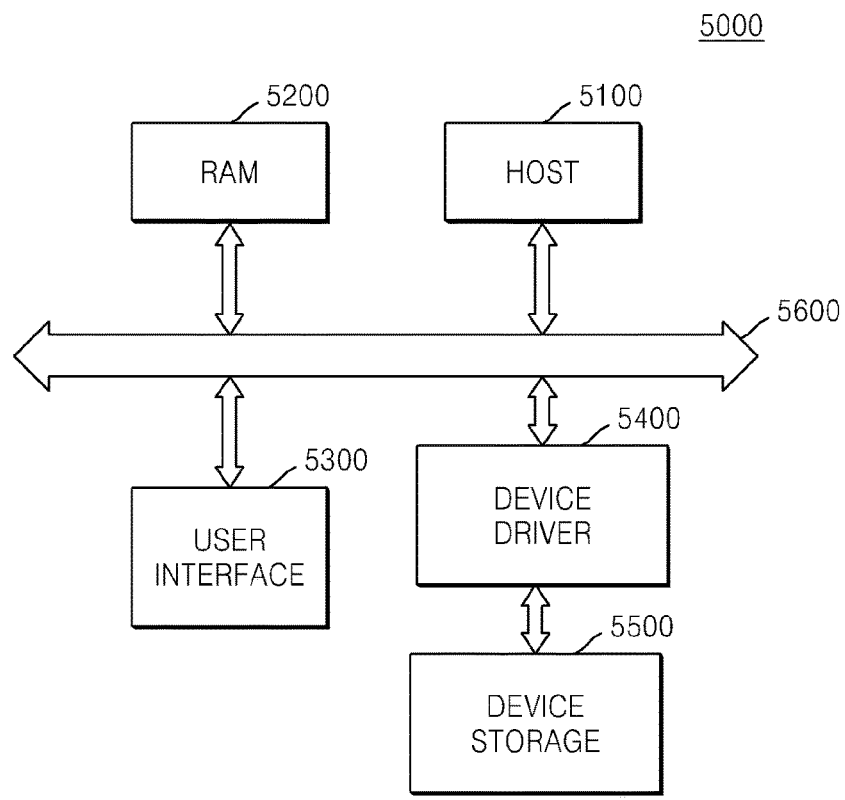
FIG. 33 is a diagram illustrating a computing system according to an embodiment of the inventive concept.

FIG. 33 is a diagram illustrating a computing system 5000 according to an embodiment of the inventive concept.

The computing system 5000 of FIG. 33 may be a mobile device or a desktop computer, and may include a host 5100 including a CPU, a RAM 5200, a user interface 5300, and a device driver 5400 which are electrically connected to a bus 5600. A storage device 5500 may be connected to the device driver 5400.

The host 5100 and the RAM 5200 may be respectively the processor 110 and the main memory 120 of FIG. 2. Also, the storage device 5500 may be the storage device 200 of FIG. 2.

The host 5100 may control an overall operation of the computing system 5000, and may perform calculations or data processing corresponding to a user's command that is input through the user interface 5300. The RAM 5200 may function as a data memory of the host 5100, and the host 5100 may write or read user data to or from the storage device 5500 by using the device driver 5400. Also, although the device driver 5400 for controlling an operation of the storage device 5500 is provided outside the host 5100 in FIG. 33, the device driver 5400 may be provided inside the host 5100.

Figure 34:
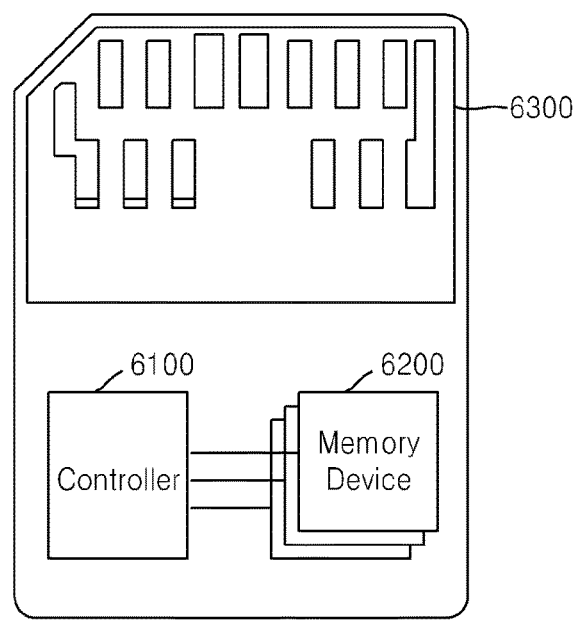
FIG. 34 is a diagram illustrating a memory card that is applied to the storage device of the data processing system, according to an embodiment of the inventive concept.

FIG. 34 is a diagram illustrating a memory card 6000 that may be applied to the storage device 200 of the data processing system 1000, according to an embodiment of the inventive concept.

The memory card 6000 may be a portable storage device that may be used by being connected to an electronic device such as a mobile device or a desktop computer. As shown in FIG. 34, the memory card 6000 may include memory device 6200, a memory controller 6100, and a port area 6300. The memory card 6000 may communicate with an external host through the port area 6300, and the memory controller 6100 may control the memory device 6200. The memory controller 6100 and the memory device 6200 may be respectively the memory controller 210 and the memory device 220 of FIG. 2. A plurality of memory devices 6200 may be included on memory card 6000.

The storage device 200 shown in FIG. 2 according to the inventive concept may be mounted by using various types of packages. For example, the storage device 200 of the inventive concept may be mounted by using packages such as Package on Package (PoP), Ball grid arrays (BGAs), Chip scale packages (CSPs), Plastic Leaded Chip Carrier (PLCC), Plastic Dual In-Line Package (PDIP), Die in Waffle Pack, Die in Wafer Form, Chip On Board (COB), Ceramic Dual In-Line Package (CERDIP), Plastic MetricQuad Flat Pack (MQFP), Thin Quad Flatpack (TQFP), Small Outline (SOIC), Shrink Small Outline Package (SSOP), Thin Small Outline (TSOP), Thin Quad Flatpack (TQFP), System In Package (SIP), Multi Chip Package (MCP), Wafer-level Fabricated Package (WFP), or Wafer-Level Processed Stack Package (WSP).

While the inventive concept has been particularly shown and described with reference to exemplary embodiments thereof by using specific terms, the embodiments and terms have merely been used to explain the inventive concept and should not be construed as limiting the scope of the inventive concept as defined by the claims. The exemplary embodiments should be considered in a descriptive sense only and not for purposes of limitation. Therefore, the scope of the inventive concept is defined not by the detailed description of the inventive concept but by the appended claims, and all differences within the scope will be construed as being included in the inventive concept.

What is claimed is:

1. A memory swapping method comprising:
    receiving at a storage device queue information from a host device, the queue information for a memory swapping task;
    performing part of the memory swapping task in the storage device based on the queue information;
    receiving a command at the storage device, the command corresponding to the queue information from the host device, said receiving of the command occurring after said performing of the part of the memory swapping task is completed; and
    performing in the storage device a remaining part of the memory swapping task according to the command by using a result of the part of the memory swapping task previously performed.

2. The method of claim 1, wherein the queue information comprises information about the memory swapping task and information about an attribute of data that is requested according to the memory swapping task.

3. The method of claim 2, wherein the queue information further comprises task priority information.

4. The method of claim 1, wherein the queue information is transmitted from the host device to the storage device using a preset command.

5. The method of claim 1, wherein when a task for a read command is included in the queue information, the part of the memory swapping task comprises an operation of reading data from a nonvolatile memory device of the storage device and storing the read data in a random access memory of the storage device.

6. The method of claim 1, wherein when a task for a write command is included in the queue information, the part of the memory swapping task comprises an operation of writing data in the storage device by performing at least one selected from address conversion and memory interleaving scheduling by the storage device.

7. The method of claim 1, wherein said performing of the part of the memory swapping task comprises:
  executing address conversion by the storage device so that a page-out operation and a page-in operation for the memory swapping task are performed in different memory chips of the storage device based on the queue information; and
  performing by the storage device part of at least one selected from a write operation according to the page-out operation and a read operation according to the page-in operation based on a result of the address conversion.

8. The method of claim 7, wherein the page-in operation is performed wherein a program time of the page-out operation and a read time of the page-in operation partially overlap each other.

9. The method of claim 1, wherein said performing of the part of the memory swapping task comprises:
  re-establishing a task execution order by the storage device based on a plurality of pieces of the queue information that are received from the host device; and
  performing the part of the memory swapping task in the storage device based on the re-established task execution order.

10. The method of claim 9, wherein said re-establishing of the task execution order is based on priority information that is included in the plurality of pieces of queue information.

11. The method of claim 1, wherein said receiving of the command comprises:
  transmitting from the storage device a signal indicating a queue status of the storage device to the host device; and
  receiving at the storage device the command corresponding to the queue information from the host device based on the signal indicating the queue status,
  wherein the signal indicating the queue status comprises information indicating that said performing of the part of the memory swapping task based on the queue information is completed.

12. A storage device comprising:
  a memory device to which memory swap space is allocated; and
  a memory controller configured to control a read operation and a write operation of the memory device,
  wherein the memory controller is configured to receive queue information for a memory swapping task from a host device, control the memory device to perform part of the memory swapping task based on the received queue information, generate a signal indicating a queue status of the storage device and transmit the signal to the host device after the performing part of the memory swapping task, receive a command corresponding to the queue information from the host device after the transmitting the signal, and then control the memory device to perform a remaining part of the memory swapping task according to the command.

13. The storage device of claim 12, wherein the memory device comprises a plurality of flash memory chips, and the memory controller is configured to execute address conversion to perform a page-out operation and a page-in operation for the memory swapping task in different flash memory chips of the memory device.

14. The storage device of claim 12, wherein the memory controller is configured to re-establish a task execution order of the memory swapping task based on priority information that is included in the queue information.

15. The storage device of claim 12, wherein when a task for a page-out operation and a task for a page-in operation for the memory swapping task are included in the queue information, the memory controller is configured to control the read operation or the write operation of the memory device to firstly perform the page-in operation.

* * * * *